United States Patent
Wang et al.

(10) Patent No.: US 10,421,058 B2
(45) Date of Patent: *Sep. 24, 2019

(54) SYNTHESIS OF ORDERED MICROPOROUS ACTIVATED CARBONS BY CHEMICAL VAPOR DEPOSITION

(71) Applicants: Saudi Arabian Oil Company, Dhahran (SA); Korea Advanced Institute of Science and Technology, Daejeon (KR)

(72) Inventors: Yuguo Wang, Dhahran (SA); Cemal Ercan, Dhahran (SA); Rashid M. Othman, Khobar (SA); Minkee Choi, Daejeon (KR); Seokin Choi, Daejeon (KR)

(73) Assignees: SAUDI ARABIAN OIL COMPANY (SA); KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 18 days.

This patent is subject to a terminal disclaimer.

(21) Appl. No.: 15/433,477

(22) Filed: Feb. 15, 2017

(65) Prior Publication Data

US 2017/0225147 A1    Aug. 10, 2017

Related U.S. Application Data

(63) Continuation of application No. 14/513,707, filed on Oct. 14, 2014, now Pat. No. 9,604,194.

(51) Int. Cl.
*C01B 31/08* (2006.01)
*B01J 20/20* (2006.01)
(Continued)

(52) U.S. Cl.
CPC ............. *B01J 20/20* (2013.01); *B01J 3/008* (2013.01); *B01J 19/2415* (2013.01);
(Continued)

(58) Field of Classification Search
CPC .................................................. C01B 32/306
See application file for complete search history.

(56) References Cited

U.S. PATENT DOCUMENTS

| 4,617,035 A | 10/1986 | Wakaizumi et al. |
| 6,855,376 B2 | 2/2005 | Hwang et al. |
| (Continued) | | |

FOREIGN PATENT DOCUMENTS

| EP | 2272581 A1 | 1/2011 |
| JP | 2006335596 A | 12/2006 |

OTHER PUBLICATIONS

International Search Report and Written Opinion for related PCT application PCT/US2015/055529 dated Feb. 24, 2016.
(Continued)

*Primary Examiner* — Stuart L Hendrickson
(74) *Attorney, Agent, or Firm* — Bracewell LLP; Constance Gall Rhebergen

(57) ABSTRACT

Embodiments provide a methane microporous carbon adsorbent including a thermally-treated CVD carbon having a shape in the form of a negative replica of a crystalline zeolite has a BET specific surface area, a micropore volume, a micropore to mesopore volume ratio, a stored methane value and a methane delivered value and a sequential carbon synthesis method for forming the methane microporous carbon adsorbent. Introducing an organic precursor gas for a chemical vapor deposition (CVD) period to a crystalline zeolite that is maintained at a CVD temperature forms the carbon-zeolite composite. Introducing a non-reactive gas for a thermal treatment period to the carbon-zeolite composite maintained at a thermal treatment temperature forms the thermally-treated carbon-zeolite composite. Introducing an aqueous strong mineral acid mixture to the thermally-treated carbon-zeolite composite forms the methane microporous carbon adsorbent. The crystalline zeolite includes tri-ethanolamine (TEA) and has a shape that is orthogonal with a mid-edge length in a range of 8 μm to 20 μm.

18 Claims, 24 Drawing Sheets

(a)                    (b)                    (c)

(51) Int. Cl.
*B01J 20/28* (2006.01)
*B01J 20/32* (2006.01)
*B01J 20/30* (2006.01)
*B01J 19/24* (2006.01)
*B01J 3/00* (2006.01)
*C01B 32/05* (2017.01)
*C01B 32/306* (2017.01)
*C10L 3/06* (2006.01)

(52) U.S. Cl.
CPC ... *B01J 20/28045* (2013.01); *B01J 20/28066* (2013.01); *B01J 20/28073* (2013.01); *B01J 20/28076* (2013.01); *B01J 20/3057* (2013.01); *B01J 20/3078* (2013.01); *B01J 20/3204* (2013.01); *B01J 20/324* (2013.01); *B01J 20/3214* (2013.01); *C01B 32/05* (2017.08); *C01B 32/306* (2017.08); *C10L 3/06* (2013.01); *B01D 2253/102* (2013.01); *B01D 2257/7025* (2013.01); *B01D 2259/4525* (2013.01); *B01J 2219/0011* (2013.01); *B01J 2219/00094* (2013.01); *B01J 2219/00105* (2013.01); *B01J 2219/00135* (2013.01); *B01J 2219/00157* (2013.01); *B01J 2219/00159* (2013.01); *C01P 2006/12* (2013.01); *C01P 2006/14* (2013.01); *Y02C 20/20* (2013.01); *Y02P 20/134* (2015.11)

(56) References Cited

U.S. PATENT DOCUMENTS

| | | | |
|---|---|---|---|
| 7,041,616 | B1 | 5/2006 | Nenoff et al. |
| 8,591,857 | B2 | 11/2013 | Backov et al. |
| 8,657,923 | B2 | 2/2014 | Ito et al. |
| 9,604,194 | B2 * | 3/2017 | Wang ............... B01J 20/28045 |
| 2009/0004095 | A1 | 1/2009 | Yoon et al. |
| 2009/0191116 | A1 | 7/2009 | Yoon et al. |
| 2010/0202958 | A1 | 8/2010 | Yoon et al. |
| 2011/0005392 | A1 | 1/2011 | Pirngruber et al. |
| 2011/0052486 | A1 | 3/2011 | Masashi et al. |
| 2013/0220974 | A1 | 8/2013 | Yushin |
| 2013/0283854 | A1 | 10/2013 | Wang et al. |

OTHER PUBLICATIONS

Guan et al., "Methane storage in a template—synthesized carbon", Separation and Purification Technology, 2008, pp. 124-126, vol. 64, No. 1, Elsevier.

Hou et al., "An easy method for the synthesis of ordered microporous carbons by the template technique", Carbon, 2005, pp. 2624-2627, vol. 43, No. 12, Elsevier.

* cited by examiner

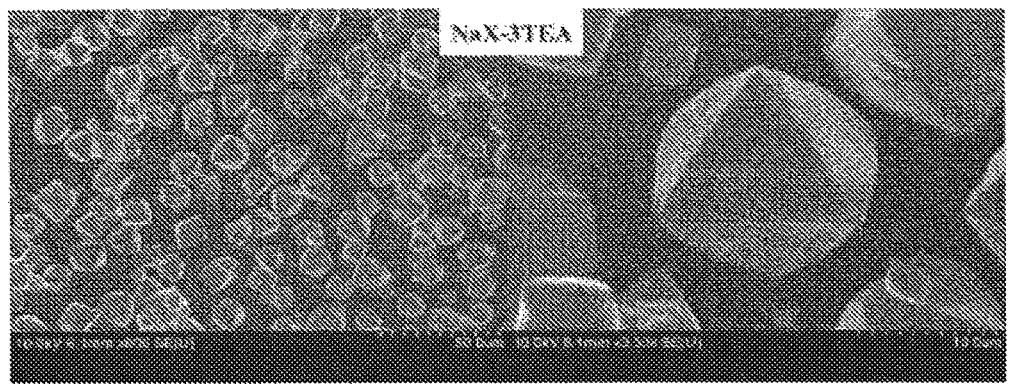
(a)
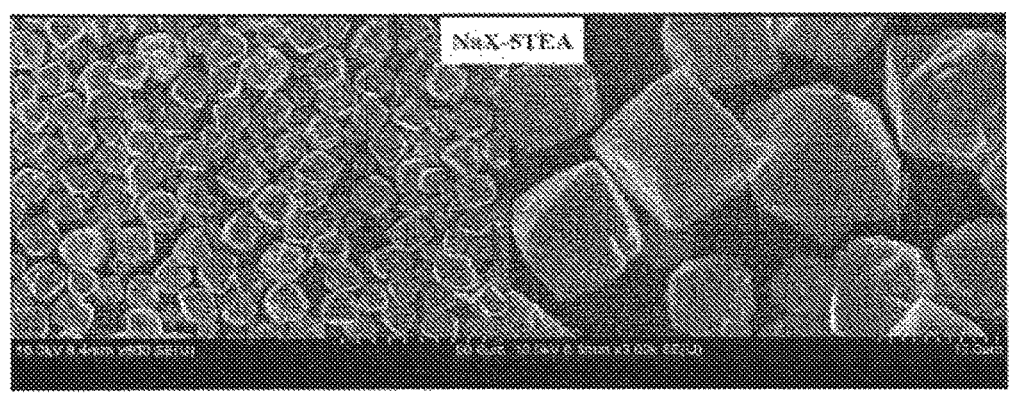
(b)
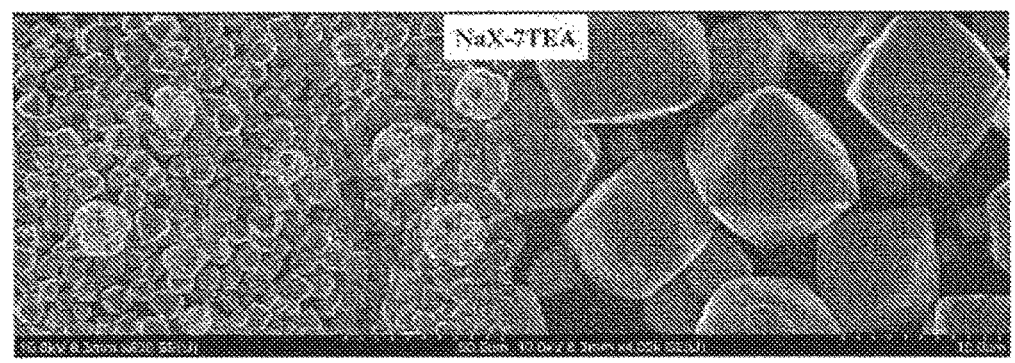
(c)
FIG. 6

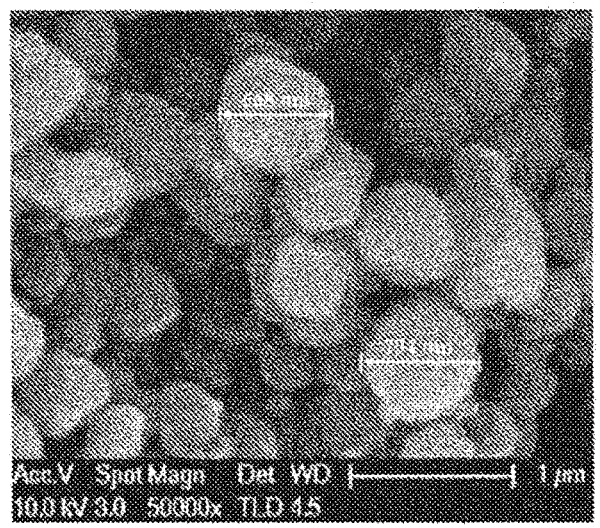
(a)
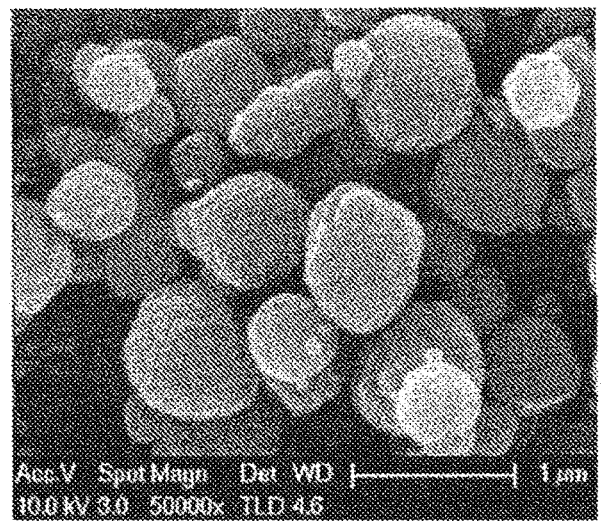
(b)
FIG. 15

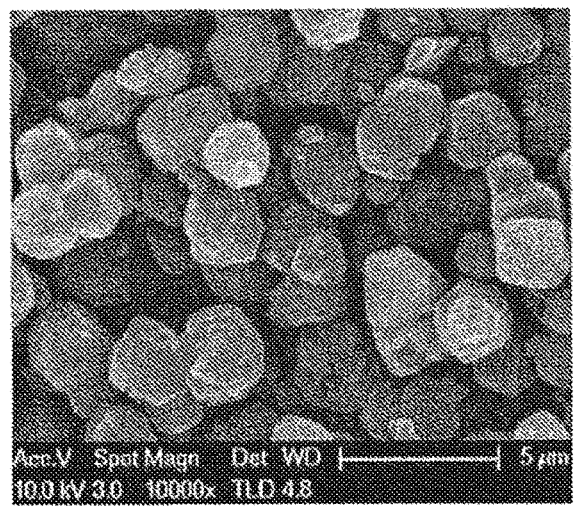
(a)
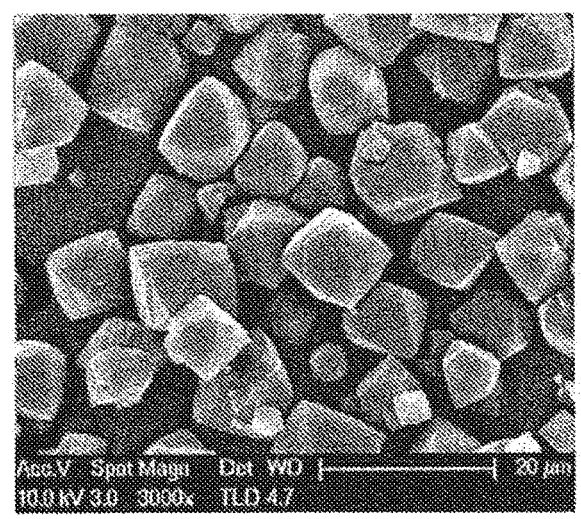
(b)
FIG. 20

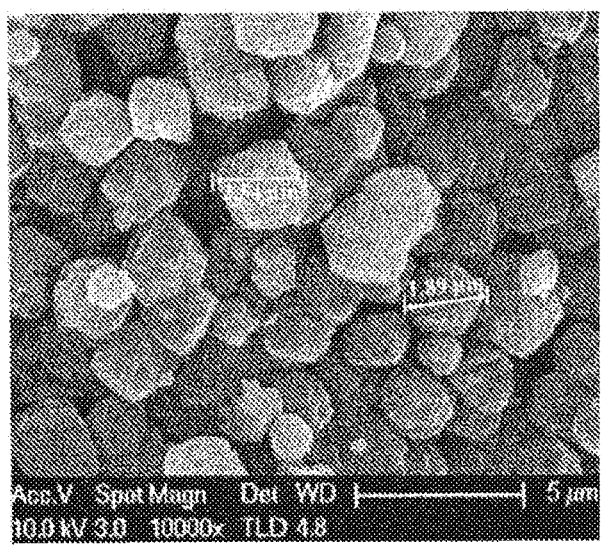
(a)
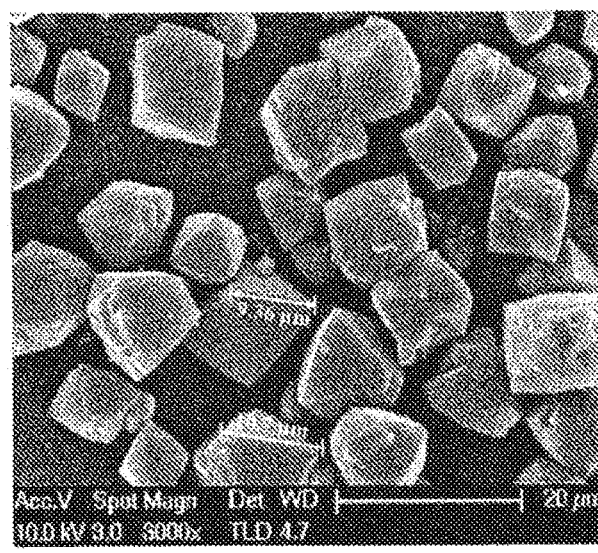
(b)
FIG. 23

SYNTHESIS OF ORDERED MICROPOROUS ACTIVATED CARBONS BY CHEMICAL VAPOR DEPOSITION

CROSS REFERENCE TO RELATED APPLICATION

This application is a continuation application of U.S. patent application Ser. No. 14/513,707, filed on Oct. 14, 2014, entitled "Synthesis of Ordered Microporous Activated Carbons by Chemical Vapor Deposition," which is hereby incorporated by reference in its entirety into this application.

BACKGROUND

Field

Embodiments relate to microporous carbons. More specifically, embodiments relate to the formation of microporous carbons and use in natural gas storage and transportation systems.

Description of the Related Art

Natural gas is the portable and preferred fuel of choice around the world. Natural gas burns more completely than other traditional fuels, including petroleum and coal; therefore, the combustion of natural gas is comparatively less harmful to the environment. Natural gas and similar products, including LNG, propane and other compressed-gas fuels, are much more efficient in engine and turbine combustion systems. Pipelines are the traditional and most cost-effective means of transporting natural gas from the producer to the consumer.

When producing electricity or natural gas for non-commercial users, a significant problem arises for natural gas transportation networks: diurnal demand. People, unlike manufacturing plants or facilities, tend not to be steady energy users throughout the day. People consume greater amounts of electricity during the day and into the early evening and much less at night and into the early morning. The higher rates of consumption form a "peak period of demand" and the lower rate of consumption creates a "non-peak period of demand". This daily trend occurs throughout the year. During different seasons, however, the length of each period (longer or shorter periods of natural light requiring reduced or greater amounts of artificial light, respectively) and the amplitude of the period (for example, greater amounts demanded at higher and lower temperatures versus more moderate temperatures) can change the amount of demand during the diurnal period. The location of the demand also has an impact upon the diurnal demand. In cooler environments, overall daily electrical and natural gas demand is lower in the summer months and higher in winter months as consumers use heating equipment. In warmer environments, the daily demand trends are opposite as consumer use air conditioning units when it is hot.

Swinging electrical and natural gas consumption—not only in daily use but also in seasonal differences—results in variability across the natural gas transportation and production system. Natural gas production, however, is nearly constant. The supply-demand gap between natural gas production and total consumption results in a "gas demand lag". The lag, without intervention, manifests itself as system pressure increases and decreases ("swings") across the natural gas transportation grid.

Electrical generation facilities prefer constant, high-pressure natural gas as a feedstock. Pressure swings in natural gas feed can damage the electrical generation equipment, especially rotational equipment, including gas turbines, due to sudden inappropriate feed-to-fuel ratios that cause equipment slowdowns while under load.

A solution to mitigating the pressure swings in gas transportation networks is provided for in U.S. Pat. App. Pub. No. 2013/0283854 (published Oct. 31, 2013) (Wang, et al.), titled "Adsorbed Natural Gas Storage Facility", which uses a microporous adsorbent to adsorb and desorb natural gas.

Microporous adsorbents for adsorbed natural gas (ANG) storage include activated carbons, metal-organic frameworks (MOFs), zeolites and other organic or inorganic porous solids. MOFs have been reported to have surface areas up to 4000 meters squared per gram ($m^2/g$) and absolute methane adsorption capacities as high as 230 volume to volume (v/v) absolute methane adsorption at 290 K and 35 bar (sometimes referred to as the "storage amount" ratio or the "amount stored" ratio). There is some question, however, as to whether this high number of absolute methane adsorption is accurate. Several operational issues limit the practical use of MOFs in natural gas adsorption-desorption systems. Methane, once adsorbed into the framework, is strongly bound, so for desorption temperatures as high as 100° C. may be required to free the adsorbed methane. MOFs are known to have a reduced hydrothermal stability, so heating them to release methane repeatedly will eventually degrade the framework. MOFs also are intolerant to natural gas impurities such as hydrogen sulfide, black/carbon-silicone powder and mercaptans, which are common in natural gas.

Metal oxide adsorbents such as zeolites tend to adsorb less methane than activated carbon materials at similar conditions. MOs possess a smaller surface area—reportedly less than about 800 $m^2/g$. Zeolites also have hydrophilic surfaces relative to activate carbon material that makes them adsorb water over other constituents in a natural gas stream.

Activated carbon materials have surface areas in a range up to about 3000 $m^2/g$ and are relatively thermally and chemically stable materials. Activated carbons are known in the industry to have an absolute methane adsorption capacity in a range of from about 130 to about 180 v/v methane adsorption at 290 K and 35 bar.

There are several limitations to using activated carbon materials in an ANG application. Activated carbon materials have generally a lower packing density than other materials due to the presence of meso-($2<d<50$ nanometers (nm)) and macro-sized pores ($>50$ nm). Larger micropores are generated upon formation of the activated carbon material due to excessive carbon burn-off during the carbon activation process. The irregular morphology of carbon particles with high surface areas tends to cause the dense packing of particles, leaving voids between particles. The optimum pore diameter for ANG is from about 1.1 to about 1.2 nm. The meso- and macro-sized pores do not contribute to natural gas adsorption but do count as part of the material volume, resulting in lower packing density. Useful activated carbon materials have a bulk density is in a range of from about 0.20 to about 0.75 grams per cubic centimeter ($g/cm^3$).

Another issue is slow mass transport through microporous materials. Activated carbon materials having microporous can exhibit slow kinetic adsorption-desorption behavior due to slow mass transport. Slow mass transport can be attributed to large micropore volumes with smaller-than-useful pore diameters for adsorbing methane and a lack of connectivity between surface pore aperture openings (also known as "dead end pores"). Pressure and temperature changes can help accelerate the mass transfer to and from the microporous material.

Another limitation is the number of potential materials useful to design the activated carbon materials. Activated carbon materials are produced by chemical combustion of non-porous carbon precursors in a controlled manner. Although this method provides an economic way of producing material in the macro sense of a controlled reaction, rational and systematic design of specific and regular carbon pore structures is not possible due to the highly variable combustion process on the micro level. Structure parameters including surface area, pore diameter and micropore volume are strongly related to one another and are difficult to control separately. As an example, a high degree of burn-off achieves a large carbon surface area, which is positive for increasing gas storage capacity. The high degree of burn-off, however, also results in the unavoidable enlargement of pore diameters, which decreases the adsorption strength and packing density of the adsorbents per unit volume.

It is desirable to develop a method for forming an activated carbon material, the activated carbon material, and a method of its use that maintains or improves upon the packing density, the mass transport and the adsorptive strength of activated carbon materials while maintaining or improving upon the surface area and absolute methane adsorption capacities of activated carbon materials. Ease of use and handling of the activated carbon material and simplicity of manufacturing are also desirable characteristics.

SUMMARY

A methane microporous carbon adsorbent including a thermally-treated carbon template of a crystalline zeolite having a shape in the form of a negative replica of the crystalline zeolite and has a BET specific surface area, a micropore volume, a micropore to mesopore volume ratio, a stored methane value and a methane delivered value.

A sequential carbon synthesis method for forming a methane microporous carbon adsorbent includes introducing an organic precursor gas made of an organic precursor for a chemical vapor deposition (CVD) period to a crystalline zeolite that is maintained at a CVD temperature such that the carbon-zeolite composite forms. The introduced organic precursor adsorbs via CVD into the crystalline zeolite. The organic precursor converts into carbon within the crystalline zeolite. The carbon within the crystalline zeolite forms a carbon template of the zeolite. The method includes introducing a non-reactive gas for a thermal treatment period to the carbon-zeolite composite maintained at a thermal treatment temperature such that a thermally-treated carbon-zeolite composite forms. The carbon template of the zeolite within the crystalline zeolite converts into a thermally-treated carbon template of the zeolite. The method includes introducing an aqueous strong mineral acid mixture to the thermally-treated carbon-zeolite composite such that the methane microporous carbon adsorbent forms. The methane microporous carbon adsorbent is a negative replica of the crystalline zeolite, has a BET specific surface area, a micropore volume, a micropore to mesopore volume ratio, a stored methane value and a methane delivered value. The crystalline zeolite includes tri-ethanolamine (TEA) and has a shape that is orthogonal with a mid-edge length in a range of 8 μm to 20 μm.

An embodiment of the method includes introducing the organic precursor gas for a second CVD period to the thermally-treated carbon-zeolite composite. The thermally-treated carbon-zeolite composite is maintained at a second CVD temperature. A second carbon-zeolite composite forms. The organic precursor adsorbs via CVD into the thermally-treated carbon-zeolite composite. The organic precursor converts into carbon within the thermally-treated carbon-zeolite composite and forms with the thermally-treated carbon template of the zeolite a second carbon template of the zeolite. The embodiment of the method includes introducing the non-reactive gas for a second thermal treatment period to the second carbon-zeolite composite. The second carbon-zeolite composite is maintained at a second thermal treatment temperature. The second thermally-treated carbon-zeolite composite forms. The second carbon template of the zeolite within the second carbon-zeolite composite converts into a second thermally-treated carbon template of the zeolite. In this embodiment of the method, the aqueous strong mineral acid mixture is introduced to the second thermally-treated carbon-zeolite composite instead of the thermally-treated carbon-zeolite composite.

The sequential carbon synthesis of the methane microporous carbon adsorbent uses both a chemical vapor deposition (CVD) and a post-thermal treatment procedure for introducing, carbonizing and thermally treating small organic compounds acting as carbon precursors in the pores of both small and large zeolite crystals. The methane microporous carbon adsorbent has a microporous carbon structure that is the negative replica of the zeolite structure in which it forms. The methane microporous carbon adsorbent has a well-defined micropore structure and a surface area similar to the sacrificial zeolite.

"Graphitizing" does not mean that the carbon-zeolite composite within the zeolite framework converts entirely into the graphite form of carbon. Complete dehydrogenation of the hydrocarbons and formation of the interlaced mono-carbon layer, carbon-carbon bonded 3-dimensional structures occurs at temperatures in excess of the temperatures used in this process. Exposing the sacrificial zeolite framework to graphitization temperatures would cause degradation of the zeolite. Temperatures greater than 1373 K are known to cause certain zeolite structures to physically collapse in a short period of exposure. Rather, the deposited carbon forming the carbon template of the zeolite is more strongly interconnected and rearranged into a matrix of stable carbon-carbon bonds during thermal treatment as well as partially dehydrogenated in the inert atmosphere. Therefore, if the term "graphitization" or its related conjugates are used, it is in the sense that the deposition of carbon and the thermal treatment of the deposited carbon induce an elevated level of dehydrogenation and the formation of an interlacing carbon-carbon bonding network that is 3-dimensional but not to the extent that a pure graphene network forms. This process of dehydrogenation and interlacing occurs during both the deposition and the thermal treatment periods.

An embodiment of the sequential carbon synthesis method includes CVD of a zeolite while introducing an organic precursor at a CVD temperature in a range of from about 800 K to about 900 K for a CVD period in a range of from about 2 hours to about 9 hours. An embodiment of the method includes where the CVD is followed by a post-CVD thermal treatment at a thermal treatment temperature in a range of from about 1100 K to about 1200 K for a thermal treatment period of about 2 to 4 hours. In some embodiments of the method, the CVD/post-CVD thermal treatment cycles are repeated. In some embodiments of such methods, the CVD and periods between the first and the later cycles are different. The resultant thermally-treated carbon-zeolite composite is etched with an aqueous strong mineral acid mixture to remove the sacrificial zeolite template. In an embodiment of the method, the strong mineral acid is selected from the group consisting of hydrochloric acid (HCl), hydrofluoric acid (HF), nitric acid (HNO$_3$), sulfuric acid (H$_2$SO$_4$) and combinations thereof. In an embodiment of the method, the strong mineral acid is a combination of HF and an acid selected from the group consisting of HCl, HNO$_3$, and H$_2$SO$_4$. In an embodiment of the method, the resultant thermally-treated carbon-zeolite composite is etched with a strong caustic to sacrificially remove the zeolite template. In an embodiment of such a method, the strong caustic is aqueous sodium hydroxide (NaOH)$_{aq}$. The product methane microporous carbon adsorbent is the negative carbon replica of the crystalline zeolite, which is an inverse carbon matrix of the zeolite network. In embodiments that perform at an additional CVD/post-CVD thermal treatment cycle, the methane microporous carbon adsorbent has a more greatly ordered carbon structure that has an increased BET specific surface area, greater micropore volume and a reduced volume of mesopores than methane microporous carbon adsorbents that only go through one CVD/post-CVD thermal treatment cycle. This represents a greater amount of order in the thermally-treated carbon template of the zeolite. The densification of the deposited carbon during the post-CVD thermal treatment forms strong carbon-carbon molecularly bonded structures. The methane microporous carbon adsorbent that is the negative carbon replica of the crystalline zeolite has a methane adsorption and a delivery capacity, and is suitable for use in ANG storage operations.

In principle, the larger the BET specific surface area or the greater the micropore volume, the greater the methane adsorption capacity is for a given adsorbent. However, the methane adsorption capacity is also affected by pore size distribution, micro-pore volume and packing density of the materials. As long as there is no diffusion limitation, a high fraction of micropore volume is better for methane storage.

The methane microporous carbon adsorbent is a negative carbon replica. The synthesis platform is a crystalline zeolite with micropore structures. The zeolite acts as a sacrificial template for forming the methane microporous carbon adsorbent. FIG. 1 shows a simplified scheme showing the relationship between the crystalline zeolite and the negative carbon replica that becomes the methane microporous carbon adsorbent. A microporous crystalline zeolite (a) is introduced for use as a sacrificial template. Small, high carbon:hydrogen ratio organic molecules, including acetylene (1:1), propylene and ethylene (1:2), and ethanol (1:3) are introduced into the crystalline zeolite. The organic molecules are carbonized while inside the zeolite micropores, forming a carbon-zeolite composite (b). After carbon deposition, the zeolite framework is removed by acid dissolution. The acid dissolution does not affect the carbon template of the zeolite. The resultant (c) can be a large, ordered methane microporous carbon adsorbent that is a negative replica of the microporous zeolite.

An ANG storage facility for reducing the effect of diurnal demand on a natural gas source includes an adsorption bed system. The adsorption bed system has a methane storage capacity, contains a methane microporous carbon adsorbent and is operable to both adsorb onto and desorb methane from the methane microporous carbon adsorbent. The ANG storage facility couples to a natural gas source such that natural gas is introduced into the ANG storage facility and desorbed methane is introduced into the natural gas source. Optionally, the natural gas storage facility includes a temperature control system and a compressor system.

A method of using the ANG storage facility includes introducing natural gas into the ANG storage facility from a natural gas source during a non-peak period of demand such that the pressure within the natural gas source declines. The method includes the step of operating the ANG storage facility during the non-peak period of demand such that methane microporous carbon adsorbent selectively separates methane from the introduced natural gas and adsorbs the methane. The method includes maintaining the ANG storage facility such that the adsorbed methane remains adsorbed on the methane microporous carbon adsorbent until a peak period of demand. The method also includes the steps of operating the ANG storage facility during the period of peak demand such that the methane microporous carbon adsorbent desorbs the adsorbed methane. The method includes the step of introducing the desorbed methane into the natural gas source during the period of peak demand such that the pressure within the natural gas source increases.

The adsorption natural gas storage facility is operable to receive natural gas, to selectively separate methane from the introduced natural gas and to store the methane via adsorption on the methane microporous carbon adsorbent for a period. The ANG storage facility is also operable to desorb and release the adsorbed methane.

Introducing the methane to the natural gas source when natural gas is in greater demand and removing methane from the natural gas source when natural gas is not in demand reduces the amplitude of the pressure swings in the natural gas source, including a natural gas transportation system, caused by the difference between diurnal demand and steady natural gas production.

BRIEF DESCRIPTION OF THE DRAWINGS

These and other features, aspects, and advantages of the embodiments are better understood with regard to the following Detailed Description of the Preferred Embodiments, appended Claims, and accompanying Figures, where:

FIG. 6 shows scanning electron micrographs (SEMs) of each synthesized large NaX zeolite using TEA.

FIG. 15 shows SEMs of (a) BEA crystalline zeolite and (b) methane microporous carbon adsorbents made using the BEA zeolite.

FIG. 20 shows SEMs (a)-(b) of methane microporous carbon adsorbents made using calcium-ion substituted X zeolites.

FIG. 23 shows SEMs (a)-(b) of methane microporous carbon adsorbents made using sodium X zeolites.

FIGS. 1-24 and their description facilitate a better understanding of the system and method of sequential carbon synthesis as well as the system and method for use of the adsorbed natural gas (ANG) storage facility. In no way should FIGS. 1-24 limit or define the scope of the embodiments.

FIGS. 1-4 are simple diagrams for ease of description. Several of the graphs show traces and curves that are off-set from the true y-axis value at y=0. This is done so for the sake of clarity and is indicated in the Detailed Description and on each Figure.

DETAILED DESCRIPTION

Figure 1:
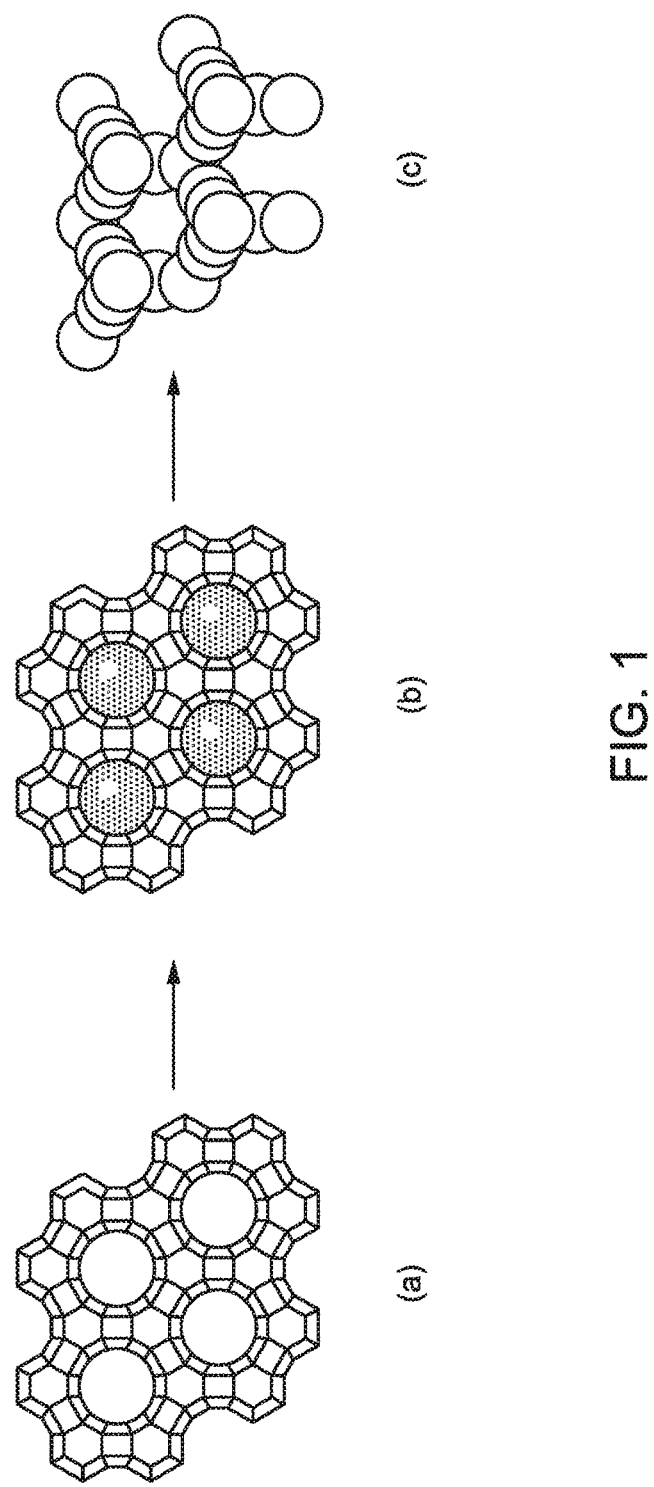
FIG. 1 shows a simplified scheme showing the relationship between (a) the crystalline zeolite and (b) the negative carbon replica that becomes (c) the methane microporous carbon adsorbent.

The Specification, which includes the Summary, Brief Description of the Drawings and the Detailed Description, and the appended Claims refer to particular features (including process or method steps). Those of skill in the art understand that the embodiments include all possible combinations and uses of particular features described in the Specification. Those of skill in the art understand that the embodiments are not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the embodiments. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which the embodiments belong unless defined otherwise.

As used in the Specification and appended Claims, the singular forms "a", "an" and "the" include plural references unless the context clearly indicates otherwise. The verb "comprises" and its conjugated forms should be interpreted as referring to elements, components or steps in a non-exclusive manner, and the embodiments illustrative disclosed suitably may be practiced in the absence of any element which is not specifically disclosed, including as "consisting essentially of" and "consisting of". The referenced elements, components or steps may be present, utilized or combined with other elements, components or steps not expressly referenced. "Operable" and its various forms means fit for its proper functioning and able to be used for its intended use. "Detect" and its conjugated forms should be interpreted to mean the identification of the presence or existence of a characteristic or property. "Determine" and its conjugated forms should be interpreted to mean the ascertainment or establishment through analysis or calculation of a characteristic or property.

Spatial terms describe the relative position of an object or a group of objects relative to another object or group of objects. The spatial relationships apply along vertical and horizontal axes. Orientation and relational words, including "upstream" and "downstream" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. Embodiments encompass and bounds smaller ranges of the interval subject to any specific exclusion provided.

Where the Specification and appended Claims reference a method comprising two or more defined steps, the defined steps can be carried out in any order or simultaneously except where the context excludes that possibility.

When a patent or a publication is referenced in this disclosure, the reference is incorporated by reference and in its entirety to the extent that it does not contradict statements made in this disclosure.

Figure 2:
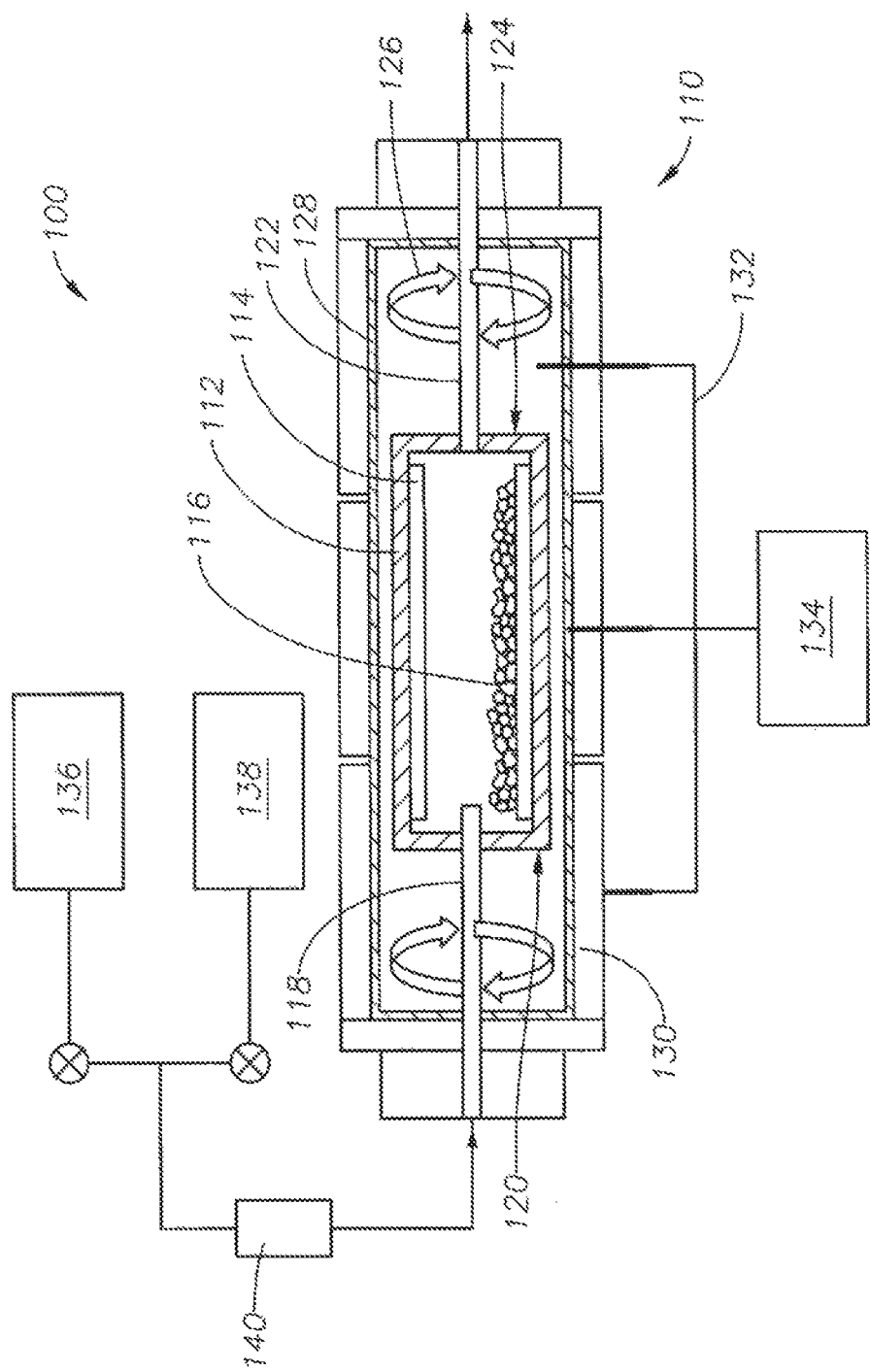
FIG. 2 is a cross-sectional diagram of a rotary tubular furnace in a rotary tubular furnace system that is useful for batch-performing several steps of the sequential carbon synthesis method.

FIG. 2 is a cross-sectional diagram of a rotary tubular furnace in a rotary tubular furnace system. The rotary tubular furnace system is useful for batch-performing several steps of the sequential carbon synthesis method. Rotary tubular furnace system 100 includes rotary tubular furnace 110. Rotary tubular furnace 110 contains cylindrical stainless-steel container 112. Cylindrical stainless-steel container 112 has several interior baffles 114 mounted along the interior surface for the length of cylindrical stainless-steel container 112. The rotation of cylindrical stainless-steel container 112 causes interior baffles 114 to contact and collide with solid material 116 previously introduced into cylindrical stainless-steel container 112. The repeated contacting and collision with interior baffles 114 distributes solid material 116 in a random manner within the interior of cylindrical stainless-steel container 112 that facilitates solid-gas mixing, distributes heat and prevents solids from adhering to one another. Cylindrical stainless-steel container 112 couples to inlet gas tubular 118 at first circular end 120 and outlet gas tubular 122 at second circular end 124. During operation, cylindrical stainless-steel container 112 rotates around a lengthwise axis (arrows 126) formed by the coupling of inlet gas tubular 118, cylindrical stainless-steel container 112 and outlet gas tubular 122.

Rotary tubular furnace 110 contains cylindrical stainless-steel container 112 within cylindrical shell 128. Heating units 130 are fixed along the exterior of the lengthwise portion of cylindrical shell 128 such that they are operable to transmit thermal energy into the interior of cylindrical shell 128. Thermocouples 132 are located in heating units 130, on cylindrical shell 128, and inside cylindrical shell 128. Temperature controller 134, which electrically couples to heating units 130 and signally to thermocouples 132, is operable to monitor the temperature values provided by thermocouples 132 and adjust the transmission of thermal energy into cylindrical shell 128 such that rotary tubular furnace system 100 is operable to maintain a set temperature for cylindrical stainless-steel container 112 during operation.

Rotary tubular furnace system 100 includes organic precursor source 136 and non-reactive gas source 138. Rotary tubular furnace system 100 is operable to selectively feed organic precursor source 136, non-reactive gas source 138 or both simultaneously to rotary tubular furnace 110. Mixer 140 is downstream of both organic precursor source 136 and non-reactive gas source 138 and is operable to blend the two source gases together into a homogeneous mixture when both are introduced simultaneously.

Using rotary tubular furnace system 100 to perform the sequential carbon synthesis includes introducing a crystalline zeolite into cylindrical stainless-steel container 112. The crystalline zeolite acts as a sacrificial template for forming the methane microporous carbon adsorbent. Cylindrical shell 128 is closed such that it is air tight. Cylindrical stainless-steel container 112 is set in rotation (arrows 126) such that the crystalline zeolite is mixed using the interior baffles 114. Non-reactive gas is introduced into cylindrical stainless-steel container 112 from non-reactive gas source 138 through inlet gas tubular 118 to purge the atmosphere within cylindrical stainless-steel container 112 through outlet gas tubular 122 and fill cylindrical stainless-steel container 112 with non-reactive gas. A first chemical vapor deposition (CVD) temperature is set using temperature controller 134, which raises in a steady and controlled manner the temperature of cylindrical stainless-steel container 112 until the first CVD temperature is detected through thermocouples 132.

Upon achieving the first CVD temperature, a mixture of the organic precursor and the non-reactive gas is introduced into cylindrical stainless-steel container 112 to fill and maintain cylindrical stainless-steel container 112 with the first CVD gas mixture. The organic precursor gas is introduced into cylindrical stainless-steel container 112 through inlet gas tubular 118 from organic precursor source 136 after mixing with non-reactive gas in mixer 140. The crystalline zeolite is exposed to the first CVD gas mixture for a first CVD period at the first CVD temperature such that the introduced organic precursor is adsorbed via CVD into the crystalline zeolite, the organic precursor converts into a deposited carbon that negatively replicates the crystalline zeolite, and a first carbon-zeolite composite forms.

After the elapse of the first CVD period, a first thermal treatment temperature is set using temperature controller 134 to raise the operating temperature of the cylindrical stainless-steel container 112 to the first thermal treatment temperature. In addition, the organic precursor source 136 is isolated such that only the non-reactive gas is introduced into cylindrical stainless-steel container 112. Upon achieving the first thermal treatment temperature, the introduction of non-reactive gas and the first thermal treatment temperature is maintained for a first thermal treatment period. During the first thermal treatment period, the deposited carbon within the carbon-zeolite composite converts into a thermally-treated carbon that negatively replicates the crystalline zeolite, and the first thermally-treated carbon template of the zeolite forms.

The processes of CVD and post-CVD thermal treatment are repeated such that a second thermally-treated carbon template of the zeolite forms. The CVD occurs for a second CVD period at the second CVD temperature. The post-CVD thermal treatment occurs at a second thermal treatment temperature for a second thermal treatment period. After expiration of the second thermal treatment period, the introduction of non-reactive gas continues and cylindrical stainless-steel container 112 is permitted to cool to room temperature. Upon reaching room temperature, the rotation of cylindrical stainless-steel container 112 is halted and solid material 116, which includes second thermally-treated carbon-zeolite composite, is recovered from rotary tubular furnace system 100.

After recovery of the second thermally-treated carbon-zeolite composite, an aqueous strong mineral acid mixture is introduced to the second thermally-treated carbon-zeolite composite. The aqueous strong mineral acid mixture etches the crystalline zeolite away from the second thermally-treated carbon template of the zeolite, forming the methane microporous carbon adsorbent.

Figure 3:
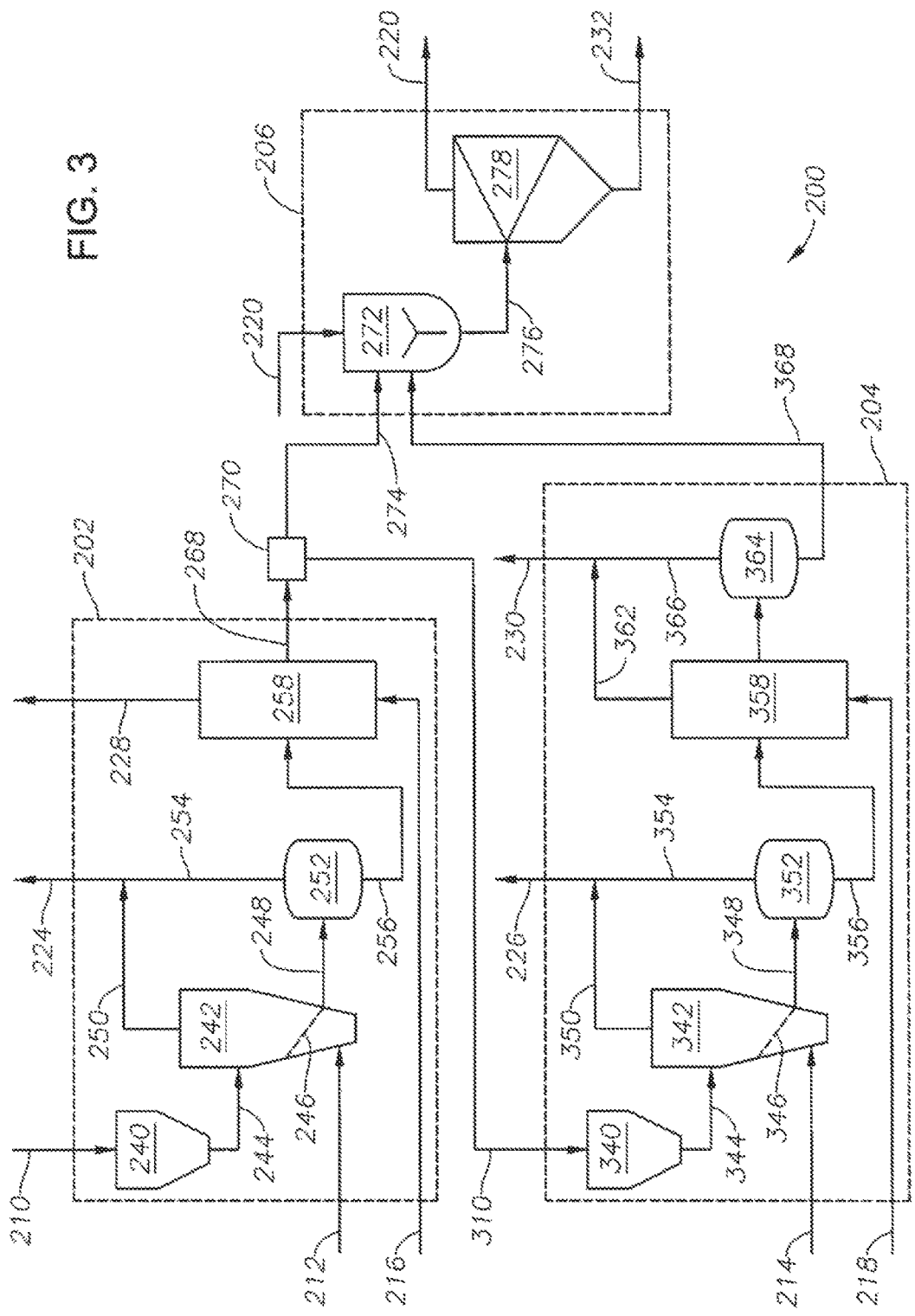
FIG. 3 is a process flow diagram of an embodiment of a system for continuously performing an embodiment of the sequential carbon synthesis method.

FIG. 3 is a process flow diagram of an embodiment of a system for continuously performing an embodiment of the sequential carbon synthesis method. Sequential carbon synthesis system 200 includes first CVD/thermal treatment system 202 (dotted box), second CVD/thermal treatment system 204 (dotted box) and recovery system 206 (dotted box). First CVD/thermal treatment system 202 and second CVD/thermal treatment system 204 are coupled in series. First CVD/thermal treatment system 202 is operable to form the first thermally-treated carbon-zeolite composite from the introduced crystalline zeolite, and second CVD/thermal treatment system 204 is operable to form the second thermally-treated carbon-zeolite composite using the first thermally-treated carbon-zeolite composite. Recovery system 206 is operable to form the methane microporous carbon adsorbent from the first thermally-treated carbon-zeolite composite, the second thermally-treated carbon-zeolite composite, and combinations thereof.

Several streams are introduced into sequential carbon synthesis system 200 to support the formation of the negative replica that is the methane microporous carbon adsorbent. Sequential carbon synthesis system 200 processes crystalline zeolite introduced through first feed line 210 from a source outside of the process into a thermally-treated carbon-zeolite composite. CVD gas supply lines 212 and 214 introduce from a source outside of the process a gas that includes the organic precursor. Acetylene, ethylene, propylene and ethanol are useful organic precursors. In an embodiment of the method, the organic precursor is selected from the group consisting of acetylene, ethylene, propylene, ethanol and combinations thereof. In an embodiment of the method, the organic precursor gas further comprises a non-reactive gas. Neutral gas supply lines 216 and 218 introduce from a source outside of the process a gas that has no reactivity with the carbon-zeolite composite during post-CVD thermal treatment at the thermal treatment temperature. Non-reactive gases include noble gases such as helium and argon. In an embodiment of the method, the non-reactive gas is selected from the group consisting of helium, argon and combinations thereof. Acid supply line 220 introduces from a source outside of the process an aqueous strong mineral acid mixture for removing the sacrificial crystalline zeolite from a thermally-treated carbon-zeolite composite. Aqueous strong mineral acid mixture includes aqueous mixtures of HCl and HF.

The produced methane microporous carbon adsorbent—a negative carbon replica of the introduced crystalline zeolite—passes from sequential carbon synthesis system 200 through adsorbent product line 222. Several streams also pass from sequential carbon synthesis system 200 as byproducts of the process. Spent CVD gas recovery lines 224 and 226 direct recovered CVD gas, which contains unused organic precursor and hydrogen from the carbonization of the organic precursor, to systems outside of the process for separation and recovery. The recovered CVD gas may also contain a non-reactive gas worth recovering in processes outside of sequential carbon synthesis system 200. Helium is a highly-limited natural resource that many countries consider a strategic material. Argon is a useful non-reactive gas and is easy to separate from the organic species. Neutral gas recovery lines 228 and 230 direct a mixture of non-reactive gas introduced through neutral gas supply lines 216 and 218 and hydrogen from post-CVD thermal treatment to systems outside of the process for recovery and purification. Spent acid recovery line 232 passes a spent aqueous strong mineral acid mixture to systems outside of the process for regeneration or neutralization. The spent aqueous strong mineral acid mixture contains dissolved aluminum and silicon from etching the sacrificial zeolite to form the methane microporous carbon adsorbent.

Sequential carbon synthesis system 200 introduces crystalline zeolite into first zeolite hopper 240 of first CVD/thermal treatment system 202 through first feed line 210. First zeolite hopper 240 couples to and meters the crystalline zeolite into first CVD reactor 242 using solids feed line 244. Sequential carbon synthesis system 200 introduces the organic precursor into the first CVD reactor 242 as part of an organic precursor gas using CVD gas supply line 212. In an embodiment of the method, the organic precursor gas includes a non-reactive gas. First CVD reactor 242 can be a number of known reactor types for mixing solids and gases together where the solids require a certain residence time within the reactor, including a moving bed type reactor or a fluidized bed reactor. First CVD reactor 242 is shown with perforated plate 246 (dashed line) such that the organic precursor gas is introduced through CVD gas supply line 212 below the stack of crystalline zeolites (not shown), which are in various stages of adsorption and carbonization. The organic precursor gas moves upward from the bottom of first CVD reactor 242 to the top, interacting with the introduced zeolite. The formed first carbon-zeolite composite passes from first CVD reactor 242 through carbonized composite line 248. The spent CVD gas passes from the top of first CVD reactor 242 through spent CVD gas line 250. Spent CVD gas line 250 couples to and feeds into spent CVD gas recovery line 224.

Sequential carbon synthesis system 200 operates first CVD reactor 242 such that the introduced organic precursor is adsorbed via chemical vapor deposition (CVD) into the crystalline zeolite, the organic precursor converts into a deposited carbon that negatively replicates the crystalline zeolite, and the first carbon-zeolite composite forms. Sequential carbon synthesis system 200 maintains first CVD reactor 242 at a first CVD temperature. In an embodiment of the method, the first CVD temperature is in a range of from about 800 K to about 900 K. Sequential carbon synthesis system 200 maintains the crystalline zeolite within first CVD reactor 242 for a first CVD period. In an embodiment of the method, the first CVD period is in range of from about 2 hours to about 9 hours.

Carbonized composite line 248 couples first CVD reactor 242 to purge vessel 252 and conveys the first carbon-zeolite composite into purge vessel 252. Sequential carbon synthesis system 200 operates purge vessel 252 to remove any remaining organic precursor from the first carbon-zeolite composite for recovery and reuse. Any recovered organic precursor is conveyed to spent CVD gas recovery line 224 through recovered gas line 254. In an embodiment of the method, the purge vessel is maintained at a sub-atmospheric pressure. A gas that is non-reactive with the first carbon-zeolite composite can be introduced to purge the first carbon-zeolite composite, including helium and argon. In an embodiment of the method, a purge gas that is non-reactive with the first carbon-zeolite composite is introduced into the purge vessel. Sequential carbon synthesis system 200 passes the purged first carbon-zeolite composite from purge vessel 252 using first thermal treatment feed line 256.

First thermal treatment feed line 256 couples purge vessel 252 to first post-CVD thermal treatment unit 258. Sequential carbon synthesis system 200 introduces the purged first carbon-zeolite composite into first post-CVD thermal treatment unit 258. Neutral gas supply line 216 introduces the non-reactive gas into first post-CVD thermal treatment unit 258. First post-CVD thermal treatment unit 258 can be a number of known reactor types for mixing solids and gases together where the solids require a certain residence time within the reactor as previously described. The formed first thermally-treated carbon-zeolite composite passes from first post-CVD thermal treatment unit 258 through first treatment product line 268. In doing so, the first thermally-treated carbon-zeolite composite passes from first CVD/thermal treatment system 202. The spent thermal treatment gas, which comprises non-reactive gas as well as evolved hydrogen from the thermal treatment of the carbon-zeolite composite, passes from the top of first post-CVD thermal treatment unit 258 through neutral gas recovery line 228.

Sequential carbon synthesis system 200 operates first post-CVD thermal treatment unit 258 such that the carbon template of the zeolite within the first carbon-zeolite composite converts into a thermally-treated carbon template of the zeolite that negatively replicates the zeolite. Sequential carbon synthesis system 200 maintains first post-CVD thermal treatment unit 258 at a first thermal treatment temperature. In an embodiment of the method, the first thermal treatment temperature is in a range of from about 1100 K to about 1200 K. Sequential carbon synthesis system 200 maintains the purged first carbon-zeolite composite within first post-CVD thermal treatment unit 258 for a first thermal treatment period. In an embodiment of the method, the first thermal treatment period is in range of from about 2 hours to about 4 hours.

Sequential carbon synthesis system 200 includes solids feeds splitter 270, which is operable to selectively direct the first thermally-treated carbon-zeolite composite received from coupled first treatment product line 268 towards zeolite reactor 272 via reactor feed line 274 or towards second zeolite hopper 340 via second feed line 310, or both in proportion at the same time. Solids feeds splitter 270 is operable to direct none, at least a portion of the first thermally-treated carbon-zeolite composite towards zeolite reactor 272 and the remainder, if any, towards second zeolite hopper 340.

The inclusion of a splitter allows the flexibility to operate the sequential carbon synthesis system to form methane microporous carbon adsorbents using only the first CVD/thermal treatment system, the second CVD/thermal treatment systems, or both simultaneously.

Recovery system 206 of sequential carbon synthesis system 200 includes zeolite reactor 272. Reactor feed line 274 couples purge vessel 264 to zeolite reactor 272 and conveys the first thermally-treated carbon-zeolite composite into zeolite reactor 272. Sequential carbon synthesis system 200 introduces the aqueous strong mineral acid mixture into zeolite reactor 272 through acid supply line 220. Zeolite reactor 272 is operable to form the methane microporous carbon adsorbent. Zeolite reactor 272 etches the crystalline zeolite of the first thermally-treated carbon-zeolite composite from the thermally-treated carbon template of the zeolite using the aqueous strong mineral acid mixture. In an embodiment of the method, the first thermally-treated carbon-zeolite composite is maintained within the zeolite rector for a residence time in a range of from about an hour to about two hours. In an embodiment of the method, the aqueous strong mineral acid mixture comprises HCl and HF. The aqueous strong mineral acid mixture upon reaction with the crystalline zeolite converts into the spent aqueous strong mineral acid mixture. Sequential carbon synthesis system 200 passes the suspension of methane microporous carbon adsorbent and spent aqueous strong mineral acid mixture from zeolite reactor 272 using zeolite reactor product line 276.

Recovery system 206 also includes adsorbent recovery unit 278. Zeolite reactor product line 276 couples zeolite reactor 272 to adsorbent recovery unit 278 and conveys the suspension of methane microporous carbon adsorbent and spent aqueous strong mineral acid mixture into adsorbent recovery unit 278. Adsorbent recovery unit 278 is operable to separate the suspension into the methane microporous carbon adsorbent and the spent aqueous strong mineral acid mixture. The produced methane microporous carbon adsorbent passes through adsorbent product line 222, and spent acid recovery line 232 passes the spent aqueous strong mineral acid mixture.

Sequential carbon synthesis system 200 introduces the first thermally-treated carbon-zeolite composite into second CVD/thermal treatment system 204 using second zeolite hopper 340 through second feed line 310. Second zeolite hopper 340 couples to and meters the first thermally-treated carbon-zeolite composite into second CVD reactor 342 using solids feed line 344. Sequential carbon synthesis system 200 introduces the organic precursor into the second CVD reactor 342 as part of an organic precursor gas using CVD gas supply line 214. In an embodiment of the method, the organic precursor gas includes a non-reactive gas. Second CVD reactor 342 can be a number of known reactor types for mixing solids and gases together where the solids require a certain residence time within the reactor. Second CVD reactor 342 has perforated plate 246 (dashed line) such that the organic precursor gas is introduced through CVD gas supply line 214 below the stack of thermally-treated carbon-zeolite composite (not shown), which are in various stages of adsorption and carbonization. The organic precursor gas moves upward from the bottom of second CVD reactor 342 to the top, interacting with the introduced first thermally-treated carbon-zeolite composite. The formed second carbon-zeolite composite passes from second CVD reactor 342 through carbonized composite line 348. The spent CVD gas passes from the top of second CVD reactor 342 through spent CVD gas line 350. Spent CVD gas line 350 couples to and feeds into spent CVD gas recovery line 226.

Sequential carbon synthesis system 200 operates second CVD reactor 342 such that the introduced organic precursor is adsorbed via CVD into the first thermally-treated carbon-zeolite composite, the organic precursor converts into carbon and the second carbon-zeolite composite forms. The first thermally-treated carbon-zeolite composite already contains the first thermally-treated carbon template of the zeolite from the first CVD/post-CVD thermal treatment. The newly deposited carbon further enhances the accuracy of the negative carbon replica, although the deposited carbon is not fully incorporated into the existing first thermally-treated carbon template of the zeolite at the lower CVD temperatures. Sequential carbon synthesis system 200 maintains second CVD reactor 342 at a second CVD temperature. In an embodiment of the method, the second CVD temperature is in a range of from about 800 K to about 900 K. In an embodiment of the method, the first CVD temperature and the second CVD temperature are the same. Sequential carbon synthesis system 200 maintains the first thermally-treated carbon-zeolite composite within second CVD reactor 342 for a second CVD period. In an embodiment of the method, the second CVD period is in range of from about 2 hours to about 4 hours. In an embodiment of the method, the first CVD period and the second CVD period are the same.

Carbonized composite line 348 couples second CVD reactor 342 to purge vessel 352 and conveys the second carbon-zeolite composite into purge vessel 352. Sequential carbon synthesis system 200 operates purge vessel 352 in a similar manner as purge vessel 252. Any recovered organic precursor is conveyed to spent CVD gas recovery line 226 through recovered gas line 354. In an embodiment of the method, the purge vessel is maintained at a sub-atmospheric pressure. In an embodiment of the method, a purge gas that is non-reactive with the second carbon-zeolite composite is introduced into the purge vessel. Sequential carbon synthesis system 200 passes the purged second carbon-zeolite composite from purge vessel 352 using second thermal treatment feed line 356.

Second thermal treatment feed line 356 couples purge vessel 352 to second post-CVD thermal treatment unit 358 and introduces the purged second carbon-zeolite composite into second post-CVD thermal treatment unit 358. Sequential carbon synthesis system 200 introduces the non-reactive gas into second post-CVD thermal treatment unit 358 using neutral gas supply line 218. Second post-CVD thermal treatment unit 358 can be a number of known reactor types for mixing solids and gases together where the solids require a certain residence time within the reactor as previously described. The formed second thermally-treated carbon-zeolite composite passes from second post-CVD thermal treatment unit 358 through thermally-treated carbon-zeolite composite line 360. The spent thermal treatment gas, which comprises non-reactive gas as well as evolved hydrogen, passes from the top of second post-CVD thermal treatment unit 358 through spent thermal treatment gas line 362. Spent thermal treatment gas line 362 couples to and feeds into neutral gas recovery line 230.

Sequential carbon synthesis system 200 operates second post-CVD thermal treatment unit 358 such that the deposited carbon within the second carbon-zeolite composite converts into a thermally-treated carbon template of the zeolite that is the negative replica. The second thermally-treated carbon-zeolite composite forms as a result. The deposited carbon from the second CVD period is fully incorporated during the second thermal treatment period into the first thermally-treated template of the zeolite, thereby forming the second thermally-treated template of the zeolite. In addition, additional calcination time provides energy to the existing negative carbon replica to improve its conformance to the crystalline zeolite structure, further improving the accuracy of the negative replication. Sequential carbon synthesis system 200 maintains second post-CVD thermal treatment unit 358 at a second thermal treatment temperature. In an embodiment of the method, the second thermal treatment temperature is in a range of from about 1100 K to about 1200 K. In an embodiment of the method, the second thermal treatment temperature is the same as the first thermal treatment temperature. Sequential carbon synthesis system 200 maintains the purged second carbon-zeolite composite within second post-CVD thermal treatment unit 358 for a second thermal treatment period. In an embodiment of the method, the second thermal treatment period is in range of from about 2 hours to about 4 hours. In an embodiment of the method, the second thermal treatment period is the same as the first thermal treatment period.

Thermally-treated carbon zeolite composite line 260 couples second post-CVD thermal treatment unit 358 to purge vessel 364 and conveys the second thermally-treated carbon-zeolite composite into purge vessel 364. Sequential carbon synthesis system 200 operates purge vessel 364 to remove any remaining non-reactive gas and evolved hydrogen from second thermally-treated carbon-zeolite composite. The degassing mitigates the need for gas recovery for zeolite reactor 272, which operates using strong acids that can partially volatilize at room conditions. Any recovered gas is conveyed to neutral gas recovery line 230 through recovered gas line 366. In an embodiment of the method, the purge vessel is maintained at a sub-atmospheric pressure. Sequential carbon synthesis system 200 passes the purged second thermally-treated carbon-zeolite composite from purge vessel 364 using second treatment product line 368. In doing so, the second thermally-treated carbon-zeolite composite passes from second CVD/thermal treatment system 204.

Second treatment product line 368 couples purge vessel 364 to zeolite reactor 272 and conveys the purged second thermally-treated carbon-zeolite composite into zeolite reactor 272. Zeolite reactor 272 is operable to form the methane microporous carbon adsorbent from the second thermally-treated carbon-zeolite composite using the aqueous strong mineral acid mixture. The methane microporous carbon adsorbent forms by etching the crystalline zeolite of the second thermally-treated carbon-zeolite composite from the thermally-treated carbon template of the zeolite. In an embodiment of the method, the second thermally-treated carbon-zeolite composite is maintained within the zeolite rector for a residence time in a range of from about an hour to about two hours. The aqueous strong mineral acid mixture converts into the spent aqueous strong mineral acid mixture upon reacting with the zeolite. Sequential carbon synthesis system 200 passes the suspension of methane microporous carbon adsorbent and spent aqueous strong mineral acid mixture from zeolite reactor 272 using zeolite reactor product line 276.

Figure 4:
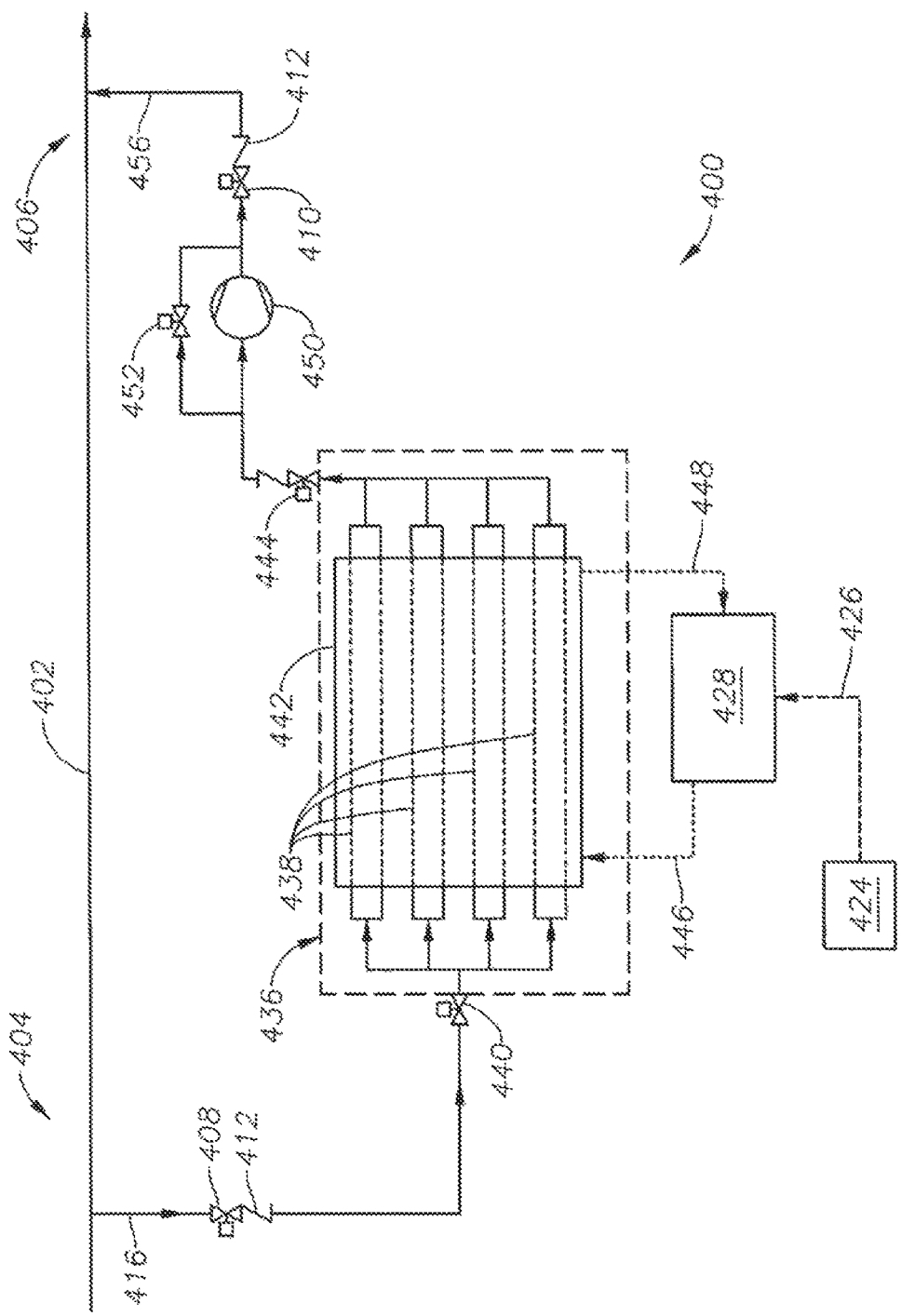
FIG. 4 is a process flow diagram of an embodiment of the adsorbed natural gas (ANG) storage facility using the methane microporous carbon adsorbent.

FIG. 4 is a process flow diagram of an embodiment of the adsorbed natural gas (ANG) storage facility using the methane microporous carbon adsorbent. Natural gas storage facility 400 couples to compressed natural gas (CNG) transportation pipeline 402, which is a natural gas source, at upstream connection 404 and downstream connection 406. Upstream isolation valve 408 and downstream isolation valve 410 are operable to fluidly isolate natural gas storage facility 400 from CNG transportation pipeline 402. Check valves 412 provide additional assurance that any fluid flowing through natural gas storage facility 400 is one-way from upstream connection 404 to downstream connection 406.

Solar power array 424 electrically couples using electrical power conduit 426 to temperature control system 428. Solar power array 424 provides electrical power such that temperature control system 428 satisfies the temperature regulation requirements of natural gas storage facility 400 during both the peak period of demand and the non-peak period of demand.

Natural gas introduced into natural gas storage facility 400 passes through adsorption beds inlet isolation valve 440 into adsorption bed system 436. Adsorption bed system 436 has several separate adsorption bed 438 in parallel. Each adsorption bed 438 contains the methane microporous carbon adsorbent (not shown) for retaining the light natural gas component during the non-peak period of demand. Adsorption beds thermal jacket 442 surrounds the exterior of and regulates the internal temperature of adsorption bed 438. Desorbed methane passes from adsorption bed 438 through adsorption beds outlet isolation valve 444.

Temperature control system 428 couples to adsorption beds thermal jacket 442. Temperature control system 428 controls, maintains and modifies the internal temperature of adsorption bed 438. Temperature control system 428 introduces a temperature-modifying fluid into adsorption beds thermal jacket 442 via adsorption bed supply conduit 446. Heat transfers to and from the temperature-modifying fluid in adsorption beds thermal jacket 442 to support the adsorption and desorption of methane from the methane microporous carbon adsorbent (not shown) contained in several adsorption bed 438. Spent temperature modifying fluid returns from adsorption beds thermal jacket 442 via adsorption bed return conduit 448.

Adsorption bed system 436 couples to storage facility compressor 450 and compressor bypass valve 452 via adsorption beds outlet isolation valve 444. Both storage facility compressor 450 and compressor bypass valve 452 provide access to CNG transportation pipeline 402 from adsorption bed 438. Storage facility compressor 450 is operable to pressurize and introduce the desorbed methane into CNG transportation pipeline 402 through discharge conduit 456. Compressor bypass valve 452 permits direct connectivity between adsorption bed system 436 and CNG transportation pipeline 402 through discharge conduit 456. Storage facility compressor 450 is operable of reduce the pressure in adsorption bed 438 to facilitate desorption and purging of adsorbed methane from the methane microporous adsorbent.

During the non-peak period of demand, a detectable condition triggers natural gas storage facility 400 to operate the isolation valves, including upstream isolation valve 408, adsorption beds inlet isolation valve 440 and downstream isolation valve 410, such that a fluid pathway forms through natural gas storage facility 400. Pressure differences between CNG transportation pipeline 402 and adsorption bed system 436 motivates natural gas to flow from CNG transportation pipeline 402 into several adsorption bed 438 of adsorption bed system 436. At reduced temperatures and increasing pressure (as more natural gas flows into natural gas storage facility 400), the methane from the introduced natural gas is selectively separated and adsorbed by the methane microporous carbon adsorbent in adsorption bed system 436. The remainder flows out of natural gas storage facility 400 back into CNG transportation pipeline 402 via discharge conduit 456. Temperature control system 428 supplies temperature-modifying fluid to adsorption beds thermal jacket 442 to facilitate the selective separation and adsorption of methane by the methane microporous carbon adsorbent in several adsorption bed 438.

Either at the end of the non-peak period of demand or when some other detectable condition is detected, upstream isolation valve 408, adsorption beds inlet isolation valve 440, adsorption beds outlet isolation valve 444 and downstream isolation valve 410 close to isolate natural gas storage facility 400 from CNG transportation pipeline 402. Temperature control system 428 maintains a storage temperature in adsorption bed system 436 such that the adsorbed methane remains adsorbed onto the methane microporous carbon adsorbent in adsorption bed 438 until the peak period of demand.

During the peak period of demand, a condition detected by natural gas storage facility 400 triggers it to operate adsorption beds outlet isolation valve 444 and downstream isolation valve 410 such that a fluid pathway forms between CNG transportation pipeline 402 and adsorption bed system 436. Temperature control system 428 operates such that the temperature-modifying fluid is provided to adsorption beds thermal jacket 442. The temperature-modifying fluid facilitates desorption of adsorbed methane from the methane microporous carbon adsorbent in the several adsorption bed 438, forming desorbed methane.

Introduction of the desorbed methane into CNG transportation pipeline 402 from adsorption bed 438 at times during the peak period of demand optionally occurs without the need of compressive assistance by opening compressor bypass valve 452. If a suitable differential pressure between adsorption bed 438 and CNG transportation pipeline 402 exists the desorbed methane optionally flows from adsorption bed system 436 into CNG transportation pipeline 402 without compression. When compression is used, closing compressor bypass valve 452 and operating storage facility compressor 450 provides motivation to the desorbed methane for introduction into CNG transportation pipeline 402 during the peak period of demand.

The operation of storage facility compressor 450 is operable to form a sub-atmospheric pressure or "partial vacuum" in the several adsorption bed 438 to facilitate desorption of methane in preparation for the next adsorption cycle. Closing adsorption beds outlet isolation valve 444 during the partial vacuum condition causes adsorption bed 438 to retain the sub-atmospheric pressure condition, which facilitates additional desorption of methane.

Natural gas storage facility 400 operations also includes operating temperature control system 428 such that it provides heating or cooling, shutting down storage facility compressor 450, opening isolation valves for adsorption bed 438 to equalize pressure and closing all other remaining isolation valves to natural gas storage facility 400.

Experiments

Several experiments show the formation of methane microporous carbon adsorbents from commercial-grade and large crystalline zeolites. Useful methane microporous carbon adsorbents are manufactured using a variety of crystalline zeolites, organic precursors, CVD temperatures and periods, and post-CVD treatment temperatures and periods. The variety of useful materials shows the versatility of the sequential carbon synthesis method in forming a relatively high surface area and micropore volume methane microporous carbon adsorbents.

Synthesis of Large Crystal NaX Zeolites (Si:Al=1.35-1.45)

This experiment shows the formation of "large" (versus commercial-grade sizes of 1 to 2 μm) crystal NaX zeolites. The large NaX zeolites are useful to act as the sacrificial framework for forming the methane microporous carbon adsorbent. In an embodiment of the method, the method further comprises the step of forming the crystalline zeolite.

In an embodiment of the method, the crystalline zeolite comprises tri-ethanolamine (TEA). Large crystal NaX zeolites are synthesized by adding TEA into a zeolite synthesis gel. $Na_2SiO_3 \cdot 5H_2O$ and sodium aluminate (55% $Al_2O_3$ and 45% $Na_2O$) are used as the silica and alumina precursors, respectively. TEA is a complexing agent for aluminum cations. The presence of TEA can retard the nucleation of zeolite crystals compared with the growth process of the crystal, resulting in larger crystals when included. The resultant gel composition is in a molar ratio of about 4.76 $Na_2O : 1.0 Al_2O_3 : 3.5 SiO_2 : 454 H_2O : n$ TEA, where n is varied at three values for forming three different test gels: About 3, 5 and 7. Each resultant test gel is transferred to a polypropylene bottle and hydrothermally crystallized at 373 K (Kelvin) for 72 hours. Each large NaX zeolite product is collected by filtration and dried at 373 K.

Figure 5:
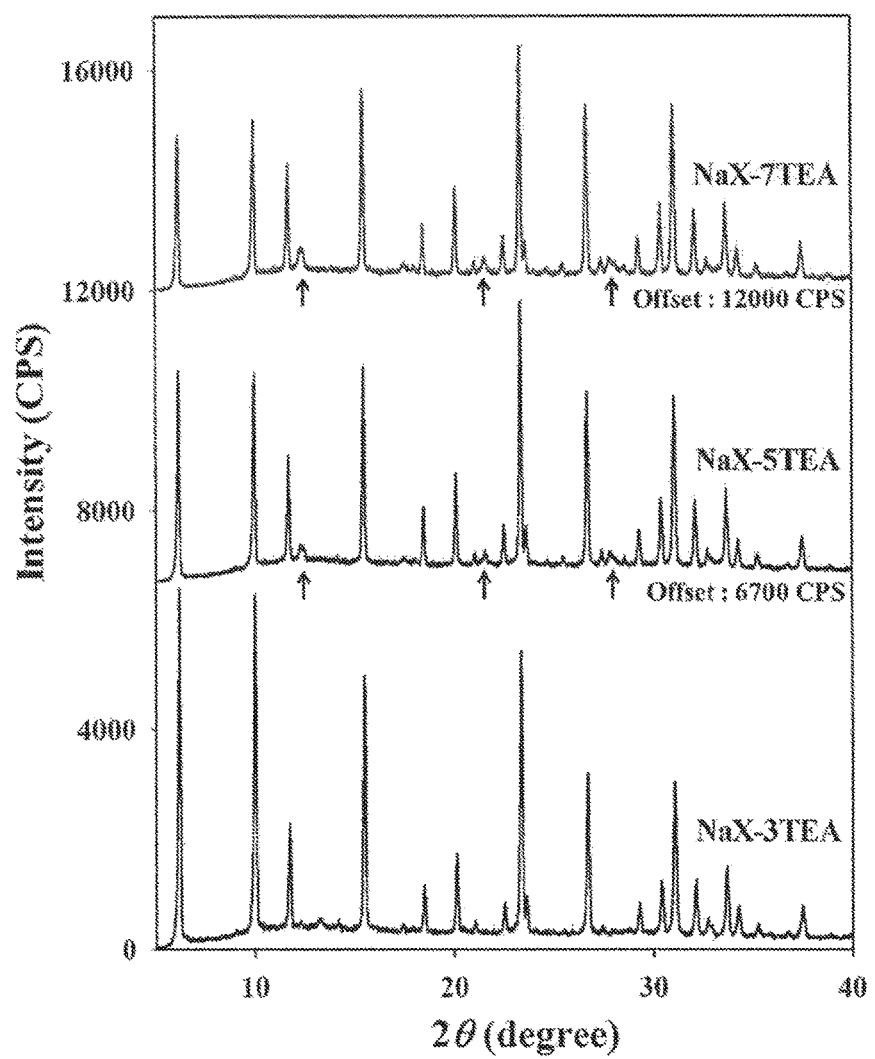
FIG. 5 is a graph showing traces of the X-ray Diffraction (XRD) analysis for each synthesized large crystal NaX zeolite.

FIG. 5 is a graph showing traces of the X-ray Diffraction (XRD) analysis for each of the synthesized large NaX zeolites. Note that for the sake of clarity in FIG. 5 that the individual traces of NaX-7TEA and NaX-5TEA are offset by a fixed value of Intensity in counts per second (CPS). In reality, all three traces have the same value at 2θ=0. The trace for NaX-5TEA is offset by 6700 CPS; the trace for NaX-7TEA is offset by 12000 CPS. XRD analysis of each large NaX zeolite shows that the NaX zeolite made with TEA (n=3) is the only large NaX zeolite with XRD trace "peaks" corresponding to those of a traditional NaX zeolite. No other impurity phase peaks are observed with this zeolite. In contrast, both large NaX zeolites made with TEA (n=5, 7) show XRD trace peaks corresponding to a "P" zeolite (GIS phase) (see arrows FIG. 5) that supplement the NaX zeolite phase peaks. The results indicate that using less TEA as part of the gel composition is more useful for forming large crystal NaX zeolites than greater amounts of the compound.

FIG. 6 shows SEMs of each synthesized large NaX zeolite using TEA. The SEMs reveal the size of the zeolite framework. Each of the SEMs (a)-(c) of FIG. 6 shows the large NaX zeolites made with TEA having the typical orthogonal crystal morphology of a NaX zeolite (approximately octahedral in geometry—FAU) but with a crystal size distribution (left portion of SEMs (a)-(c) of FIG. 6) such that the mid-edge length of the octahedron is in the range of about 8 μm (micrometers or microns) to about 20 μm. In an embodiment of the method, the crystalline zeolite has a shape that is orthogonal with a mid-edge length in a range of 8 μm to 20 μm. The crystal centered in the close-up image on the right portion of SEM (a) of FIG. 6 shows a crystalline zeolite with a mid-edge length of the octahedron of about 14.9 μm. The crystal centered in the close-up image on the right portion of SEM (b) of FIG. 6, where TEA (n=5), shows a crystalline zeolite with a mid-edge length of the octahedron of about 11.8 μm. The crystal centered in the close-up image on the right portion of SEM (c) of FIG. 6, where TEA (n=7), shows a crystalline zeolite with a mid-edge length of the octahedron of about 9.68 μm. Note that the left portion of micrographs SEMs (b)-(c) of FIG. 6 (TEA (n=5, 7 respectively)) both show combinations of P and X crystalline zeolites merged (see arrows for SEMs (b)-(c) of FIG. 6). Large NaX zeolite using TEA (n=3) do not appear to show such clustering of combined P and X zeolites.

Calcium Ion-Exchange of NaX Zeolite

In an embodiment of the method, the step of forming the crystalline zeolite includes ion-exchanging a first crystalline zeolite with calcium ions to form a second, ion-exchanged crystalline zeolite. Calcium X zeolite (CaX) is prepared by ion-exchange with a commercial-grade NaX zeolite (not the large crystal NaX previously formed) by exchanging the sodium ions for calcium ions. The commercial-grade NaX zeolites are small crystallites having a mid-edge octahedral length in a range of from about 1 to about 2 The resulting CaX zeolites are about the same size.

About 10 g (grams) of commercial-grade NaX is constantly stirred in 200 mL (milliliters) of 0.32 M (Molar) $Ca(NO_3)_2$ (calcium nitrate) solution for about 4 hours to perform the ion-exchange.

Figure 7:
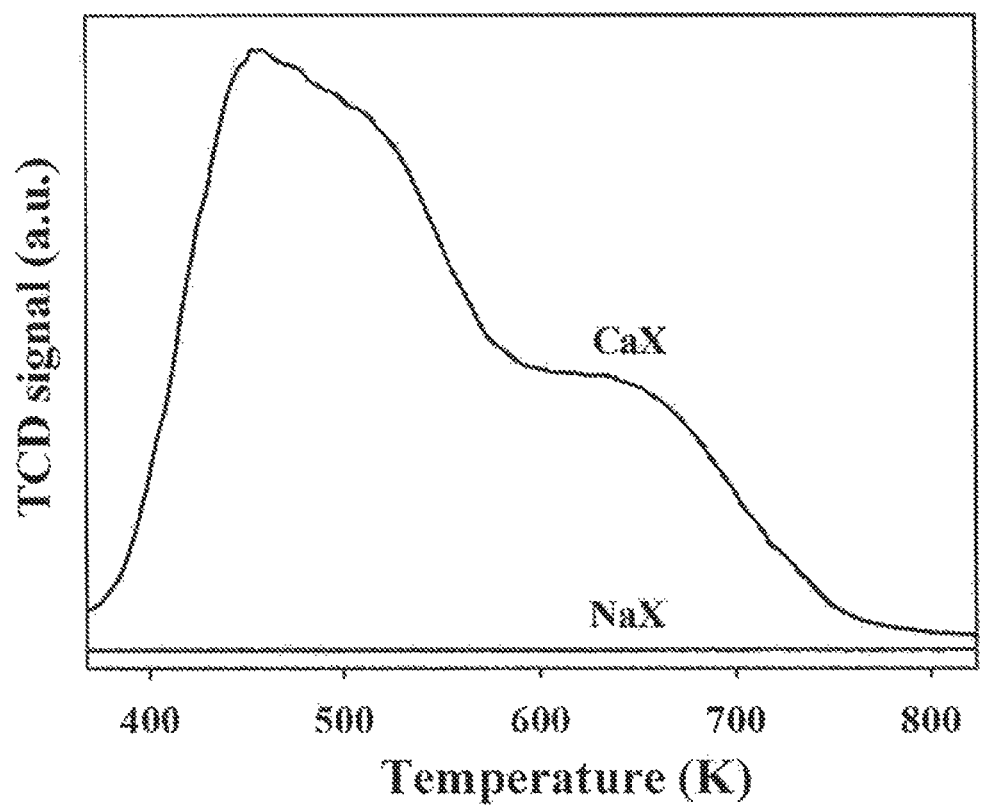
FIG. 7 is a graph showing traces of NH$_3$ temperature programmed desorption (TPD) profiles of the ion-exchanged CaX zeolite and the commercial-grade NaX zeolite.

FIG. 7 is a graph showing traces of $NH_3$ (ammonia) temperature programmed desorption (TPD) profiles of the ion-exchanged CaX zeolite and the commercial-grade NaX zeolite. FIG. 7 indicates that ion-exchange of NaX zeolite with $Ca^{2+}$ ions generate acid sites that catalyze the selective carbon deposition inside the zeolite micropores. These micropores are directed towards small hydrocarbon molecules. The ion-exchanged CaX zeolite shows two desorption peaks at 473 K and 653 K, which indicates the presence of two types of acid sites. In contrast, the commercial-grade NaX zeolite does not show any desorption profile, which indicates that there are no acid sites.

The CaX zeolite also appears to have increased thermal stability. Table 1 compares the thermal stability of commercial-grade NaX zeolite and calcium-ion exchanged X zeolite.

TABLE 1

Thermal stability of NaX and ion-exchanged CaX crystal zeolites.

| Sample | $A_z$[1] | $T_{init}$[2] (°K) | $T_{0.5}$[3] (°K) |
|---|---|---|---|
| NaX | 1 | 933 | 1043 |
| $Ca^{ex}X$ | 0.93 | 983 | 1153 |

[1]Equivalent fraction of exchange cation in zeolite.
[2]Temperature at which structural degradation is first observed from the X-ray powder pattern (K).
[3]Temperature at which the structure is 50% decomposed (K).

Table 1 shows enhancement of the thermal stability of the calcium-ion exchanged X zeolite (CaX) as seen in relative increases in both $T_{init}$ and $T_{0.5}$. This is a benefit for performing CVD using a CaX ion-exchanged zeolite over a NaX zeolite: The crystallinity of the CaX zeolite does not change even at 973 K, which is useful given that CVD temperatures are in a range of from about 873 K to about 973 K.

Carbon Deposition within CaX Zeolite

Carbon vapor deposition (CVD) is performed using a plug-flow reactor. About one gram of zeolite (commercial-grade NaX zeolite, previously-produced ion-exchanged CaX zeolite) is placed in the plug-flow reactor. The temperature is increased within the reactor in a controlled, gradual manner to a CVD temperature under continuous helium flow. After stabilization at the CVD temperature for about 30 minutes, the helium gas is changed over to the organic precursor gas that is a combination of helium and organic precursor.

Three different organic precursors are used for testing three organic precursor gases for CVD: Propylene, ethanol and acetylene. The kinetic diameters of both propylene and ethanol are 0.45 nm and acetylene is 0.33 nm. For introducing propylene as the organic precursor, the organic precursor gas has a composition of 2 vol. % propylene in a He mixture. For introducing ethanol, the organic precursor gas has a composition of ethanol-saturated helium (room temperature; 6 kPa pressure). A bubbler is used to introduce the helium through the liquid ethanol to form the saturated gas mixture. For introducing acetylene, the organic precursor gas has a composition of 2% vol. % acetylene in a He mixture. Each organic precursor gas is introduced to each zeolite sample at a mass flow rate of about 200 mL/minute per gram of zeolite. The organic precursor gas is introduced and maintained at the mass flow rate for a CVD period during which the organic precursor adsorbs into and carbonizes within the zeolite at the CVD temperature, forming a carbon-zeolite composite. After the CVD period has elapsed, the introduced organic precursor gas is changed to the non-reactive gas (pure helium) and the plug-flow reactor is permitted to cool to room temperature.

Each resultant carbon-zeolite composite is treated with an aqueous strong mineral acid mixture comprising 3.4 wt. % HCl and 3.3 wt. % HF acids. The resultant carbon-zeolite composite is exposed to the aqueous strong mineral acid mixture twice at room temperature for a 1 hour period. The resultant carbon template of the zeolite—a negative replica of the zeolite—is filtered, washed with deionized water and dried overnight at 373 K.

Effect of Organic Precursor on Forming a Carbon Template of the Zeolite Using the CaX Zeolite Two different organic precursors—propylene and ethanol—are applied at different CVD temperatures to form several carbon templates of the zeolite. For this experiment, the following designation code indicates the process used for manufacturing each carbon template of the zeolite: "zeolite template-CVD temperature/organic precursor/CVD time heat treatment", where "zeolite template" is the ion and type of zeolite template used (NaX, CaX). "CVD temperature" is in K for the four-hour period of organic precursor introduction. "Organic precursor" is selected from propylene ("P"), ethanol ("E") and acetylene ("A"). "CVD time heat treatment" indicates the length of post-CVD heat treatment at 1123 K in hours. For example, "CaX-973P5" means a CaX zeolite template at a CVD temperature of 973 K while introducing an organic precursor gas containing propylene for a CVD period of 5 hours.

Figure 8:
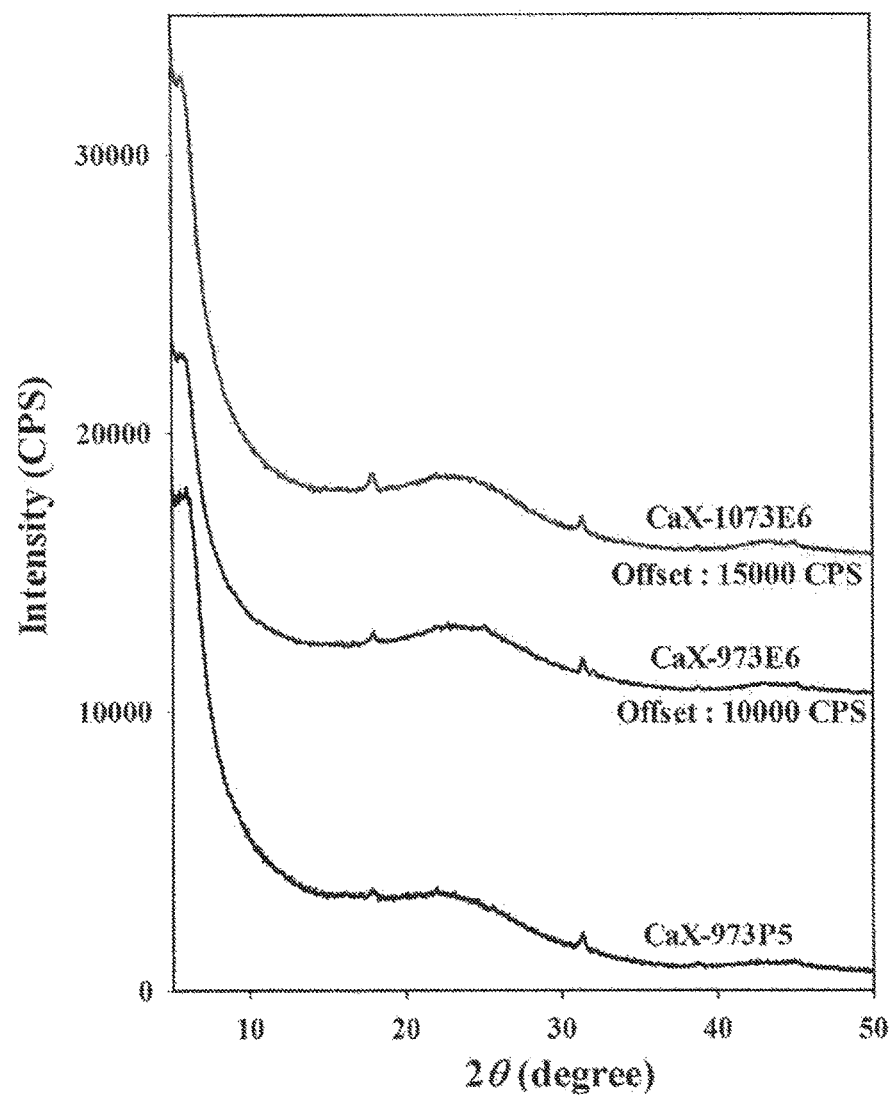
FIG. 8 is a graph showing traces of the XRD analysis for several carbon templates of the zeolite made using CaX zeolites.

FIG. 8 is a graph showing traces of the XRD analysis for several carbon templates of the zeolite made from a CaX zeolite. Three carbon templates of the zeolite are formed: CaX-1073E6, CaX-973E6 and CaX-973P5. Note that for the sake of clarity in FIG. 8 that the individual traces of CaX-1073E6 and CaX-973E6 are offset by a fixed value of Intensity in CPS. In reality, all three traces have a similar value at 2θ=0. The trace for CaX-973E6 is offset by 10000

CPS; the trace for CaX-1073E6 is offset by 15000 CPS. The XRD patterns for all three carbon templates of the zeolite as given in FIG. 8 show a broad peak around 2θ in a range of from about 5° to about 6°. The broad peak in at this 2θ value indicates that all three carbon templates of the zeolite have a structural micropore arrangement that is ordered and regular. A sharp peak in 2θ=5-6° range indicates that the carbon templates of the zeolite have regularity in microform corresponding with the structural ordering of (111) plane stacking X zeolite (also known as the "FAU" zeolite structure). This suggests that each carbon templates of the zeolite negatively replicates the micropore structure of the sacrificial zeolite. Of the three carbon templates of the zeolites, the negative replica formed from CaX-973P5 shows the strongest and most highly-resolved peak at 2θ=5-6°. The strong peak relative to the other two carbon templates of the zeolite indicates that the negative replica formed by CaX-973P5 is the most accurate representation of its zeolite.

Those of ordinary skill in gas adsorption research understand and appreciate that there are several different testing procedures for determining the surface characteristics for carbon-zeolite composites, carbon templates of the zeolite, thermally-treated carbon templates of the zeolite and methane microporous carbon adsorbents. The article by Wang, et al., "Experimental and Theoretical Study of Methane Adsorption on Granular Activate Carbons", AIChE Journal 782-788 (Vol. 58, Issue 3) ("Wang"), describes a process and an apparatus for characterizing adsorbent materials using nitrogen porosimetry at 77 K to determine the nitrogen adsorption-desorption isotherms. BET (Brunauer-Emmett-Teller) analysis provides specific surface area of the carbon templates of the zeolite as a function of the changes to relative nitrogen pressure ($P/P_0$) during the isothermic testing. The D-R (Dubinin-Radushkevich) equation uses the relative nitrogen pressure data for determining the volume of each type of pore (micro- and mesopores) present on the carbon templates of the zeolite based upon molecular stacking mechanics if the diameter of the pore is close to the working diameter of the molecule being adsorbed and surface adsorption within the pore if the diameters are dissimilar.

Figure 9:
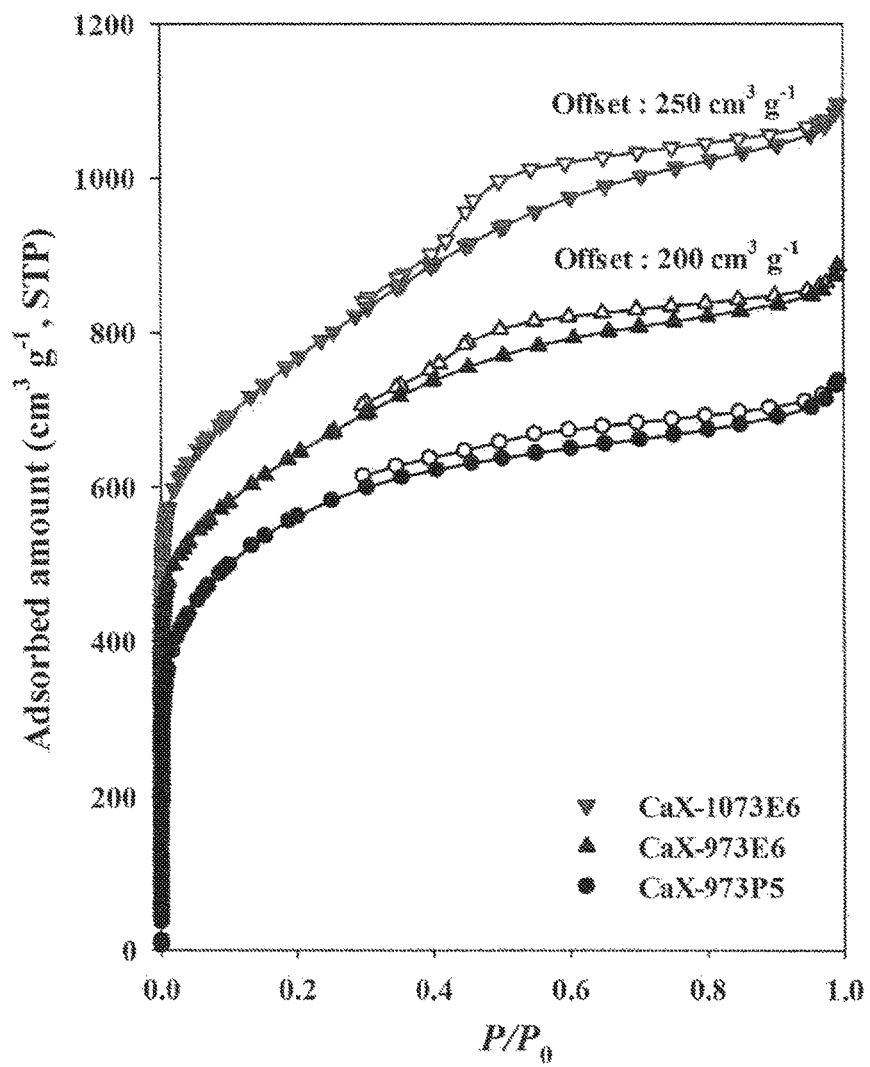
FIG. 9 is a graph showing traces of nitrogen adsorption-desorption isotherms of the carbon templates of the zeolite formed.

FIG. 9 is a graph showing traces of nitrogen adsorption-desorption isotherms of the carbon templates of the zeolite. Note that for the sake of clarity of all three traces that the isotherm trace for CaX-973E6 has been off-set by an additional adsorbed amount of 200 cm$^3$/g and the isotherm trace for CaX-1073E6 has been off-set by an additional adsorbed amount of 250 cm$^3$/g at $P/P_0$=0. The carbon templates of the zeolite formed form CaX-973P5 shows the least deviation on the return leg of the adsorption-desorption isotherm, whereas CaX-1073E6 shows the greatest. This deviation may indicate a greater amount of mesopore volume in the CaX-1073E6 carbon templates of the zeolite versus the CaX-973P5 carbon templates of the zeolite.

Figure 10:
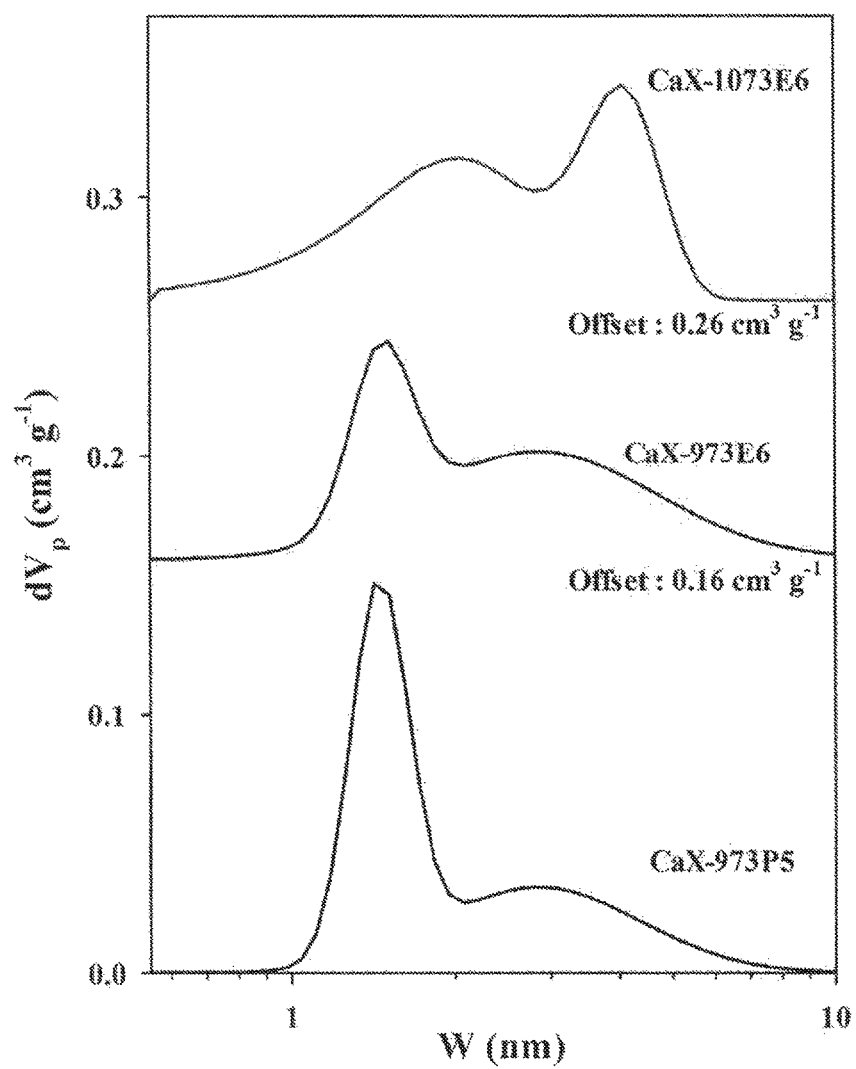
FIG. 10 is a graph showing traces of the determined pore size distribution using the non-local density function theory (NLDFT) algorithm on the nitrogen adsorption-desorption isotherm data shown in FIG. 9.

FIG. 10 is a graph showing traces of the determined pore size distribution using the non-local density function theory (NLDFT) algorithm on the nitrogen adsorption-desorption isotherm data shown in FIG. 9. Note that for the sake of clarity in FIG. 10 that the individual traces of CaX-1073E6 and CaX-973E6 carbon templates of the zeolite are offset by a fixed value of $dV_p$ in centimeters per gram (cm$^3$/g). In reality, all three traces have a similar value at W=0 nm. The trace for CaX-973E6 is offset by 0.16 cm$^3$/g; the trace for CaX-1073E6 is offset by 0.26 cm$^3$/g. FIG. 10 shows that all three carbon templates of the zeolite formed from CaX zeolites have dual porosity with both micropores (about 1.5 to 2 nm in diameter) and mesopores (about 2 to 5 nm in diameter). Hydrogen has a kinetic diameter of 2.89 Å and methane has a kinetic diameter of 3.8 Å. The trace of carbon templates of the zeolite made from CaX-973P5 indicates that it has the largest total micropore volume. The trace of carbon templates of the zeolite made from CaX-1073E6 indicates the largest total mesopore volume.

Table 2 provides surface area as well as micro- and mesopore volume data on all three carbon templates of the zeolite made from CaX in addition to a carbon template of the zeolite formed from acetylene: CaX-1023A2. As shown in FIGS. 9 and 10 and given in Table 2, the four carbon templates of the zeolite have dual porosity (both meso- and micro-pores). The CaX zeolite only has a microporous structure; therefore, the presence of mesopores, especially at levels greater than about 0.40 cm$^3$/g, indicates a less-than-desirable negative replication of the zeolite. The presence of mesopores indicates incomplete filing of the zeolite micropores with the organic precursor, which leads to a more poorly-defined replication of the pore structure.

TABLE 2

Pore structure and surface area properties of several carbon templates of the zeolite using commercial-grade sized ion-exhanged CaX zeolite.

| Sample | $S_{BET}$[1] (m$^2$/g) | $V_{micro}$[2] (cm$^3$/g) | $V_{meso}$ (cm$^3$/g) | $V_{total}$ (cm$^3$/g) |
|---|---|---|---|---|
| CaX-973P5 | 1915 | 0.75 | 0.34 | 1.09 |
| CaX-973E6 | 1596 | 0.58 | 0.48 | 1.06 |
| CaX-1073E6 | 1826 | 0.65 | 0.66 | 1.31 |
| CaX-1023A2 | 2567 | 0.95 | 0.42 | 1.37 |

[1]Brunauer-Emmett-Teller (BET) specific surface area.
[2]Micropore volume determined using the D-R equation.

In Table 2, the carbon template of the zeolite made from CaX-1023A2 exhibits a greater surface area (2567 m$^2$/g) than the carbon template of the zeolite prepared using propylene (1900 m$^2$/g) and ethanol (average 1792 m$^2$/g). The carbon template of the zeolite made from CaX-1023A2 shows the highest total pore volume (1.37 cm$^3$/g), the highest micropore volume (0.95 cm$^3$/g) and the highest micropore:mesopore volume ratio of the four samples (2.26). The carbon template of the zeolite made from CaX-973P5 has a similar micropore:mesopore volume ratio (2.20). In accordance with one example, the formed methane microporous carbon adsorbent has a BET specific surface area of 2810 m$^2$/g, and a micropore volume of 1.04 cm$^3$/g.

Although not intending to be limited by theory, the data and determinations shown in FIGS. 9 and 10 as well as Table 2 suggests that the organic precursor—regardless of size—cannot diffuse into the zeolite micropores greater than a certain amount the first time it is introduced. There is a finite volume for each pore in the zeolite that can take a limited amount of organic precursor molecules. To maximize the amount of carbon present in a micropore and to provide for a better characterization of the surface of the zeolite (both in overall surface area and micropore volume), the organic precursor should have both a small kinetic diameter to maximize the number of molecules in the micropores as well as a high ratio of carbon to other atoms (hydrogen, oxygen) such that the amount of carbon atoms in each micropore of the zeolite is maximized during CVD.

The results obtained appear to indicate that acetylene is the best of the three organic precursors followed closely by propylene. The carbon templates of the zeolite synthesized using acetylene at 1023 K for 2 hours shows a relatively high BET surface area (2567 m$^2$/g) and large micropore volume (about 1 cm$^3$/g). Acetylene does have a smaller kinetic diameter (0.33 nm) to methane (0.38 nm). Cetylene has an optimum carbon:hydrogen ratio (1:1) versus propylene (1:2) and ethanol (1:3 w/1 oxygen) and its molecular shape is linear versus having non-linear bond angles as propylene and ethanol, which makes their kinetic diameter greater.

Introducing Acetylene Organic Precursor to Large CaX Zeolites

Acetylene should be able to occupy any micropore that methane can adsorb into; however, mesopores still formed in the carbon templates of the zeolite formed from CaX-1023A2. In addition, the use of large X zeolite templates may require longer diffusion times through the zeolite. Large amounts of crystalline zeolites (>1 g), whether small or large, may require techniques to maximize the opportunity of diffusion into each zeolite with zeolite particles contacting one another and inhibiting points of vapor access into each structure. The use of greater CVD temperatures (1023 K) may cause premature deposition of carbon by acetylene before full diffusion into the sacrificial zeolite. The triple bond between the two carbon atoms of acetylene already contains a significant amount of bond energy that is fairly easy to release and promote reaction relative to double-bonded compounds. In combination with a large crystal zeolite or a bed of smaller zeolites packed together, there may not be an adequate diffusion period at the greater CVD temperatures to support the formation of the carbon negative replica of the crystalline zeolite.

A method for introducing and carbonizing acetylene at a lower CVD temperature and then thermally-treating the deposited carbon at a temperature higher than the CVD temperature but lower than a temperature where graphitizing occurs (+2000° C.) increases the density of the deposited carbon by converting loose carbon into an interconnected carbon matrix) within the micropores and on the surface of the sacrificial zeolite before the zeolite is removed. Reduced temperature acetylene CVD (≤873 K) deposits the carbon within the zeolite, forming the carbon templates of the zeolite. At a lower CVD temperature—less than 1000 K, and less than 900 K—the carbon deposition should occur more uniformly than at greater CVD temperatures by preventing carbonization before penetration throughout the sacrificial zeolite. Heat treating the carbon templates of the zeolite at a greater temperature (about 1123 K) in a non-reactive gas atmosphere dehydrogenates the deposited carbon within the carbon-zeolite composite and increases the amount of carbon-carbon bonding, forming a stronger and denser composite structure of the thermally-treated carbon template of the zeolite.

For this experiment, the following designation code indicates the process used for manufacturing each carbon template of the zeolite and methane microporous carbon adsorbent: "zeolite template-CVD temperature-CVD time heat treatment", where "zeolite template" is the ion used as part of the template zeolite (Na, Ca). "CVD temperature" is in K for the four-hour period of organic precursor introduction. "CVD time heat treatment" indicates the length of post-CVD heat treatment at 1123 K in hours. If a second "H" is present, this indicates that the organic precursor addition and post-CVD heat treatment are repeated. If an "L" is present before "zeolite template", that indicates that the zeolite template is a large-crystal X zeolite synthesized with TEA (n=3) as previously described instead of using the commercial-grade sized (1-2 μm) NaX or the similar sized ion-exchanged CaX zeolite. For example, "LCaX-873-4H" indicates the methane microporous carbon adsorbent is a synthesized using a large CaX zeolite with acetylene at a CVD temperature of 873 K, a CVD period of 4 hours and is then post-CVD thermal treatment at 1123 K for four hours. "LCaX-873-4H4H" sample is a similarly synthesized methane microporous carbon adsorbent, but the acetylene CVD application temperature and period as well as the post-CVD heat treatment are repeated a second time at similar conditions.

Table 3 shows structural properties of several carbon templates of the zeolite and methane microporous carbon adsorbents manufactured using large CaX zeolites under several different CVD and post-CVD thermal treatments. Acetylene is the organic precursor for all tests.

TABLE 3

Pore structure and surface area properties of several carbon templates of the zeolite and methane microporous carbon adsorbents formed using large-crystal ion-exchanged CaX (LCaX) zeolite.

| Entry | Sample | $S_{BET}$[1] ($m^2/g$) | $V_{micro}$[2] ($cm^3/g$) | $V_{meso}$ ($cm^3/g$) | $V_{total}$ ($cm^3/g$) |
|---|---|---|---|---|---|
| 1 | LCaX-1023-2[3] | 2462 | 0.92 | 0.30 | 1.22 |
| 2 | LCaX-1023-2[4] | 2156 | 0.83 | 0.43 | 1.26 |
| 3 | LCaX-973-3[3] | 2381 | 0.93 | 0.31 | 1.24 |
| 4 | LCaX-873-4[3] | 841 | 0.33 | 0.12 | 0.45 |
| 5 | LCaX-873-4H[3] | 3049 | 1.12 | 0.45 | 1.57 |
| 6 | LCaX-873-4H4H[3] | 2830 | 1.10 | 0.23 | 1.33 |
| 7 | LCaX-873-4H4H[4] | 2840 | 1.12 | 0.21 | 1.33 |
| 8 | LCaX-823-9H4H[4] | 2950 | 1.17 | 0.18 | 1.35 |

[1]Brunauer-Emmett-Teller (BET) specific surface area.
[2]Micropore volume ($V_{micro}$) calculated using D-R equation.
[3]1 gram zeolite used for acetylene CVD.
[4]5 grams zeolite used for acetylene CVD.

Samples numbered 1, 3 and 4 in Table 3 show several interesting effects on the produced methane microporous carbon adsorbents that may have an impact upon commercial production of methane microporous carbon adsorbents using large crystal zeolites. The three aforementioned carbon templates of the zeolite indicate that a relatively greater CVD temperature is useful in obtaining both a greater overall BET specific surface area and a micropore volume than lower CVD temperatures. Sample number 4 (LCaX-873-4) carbon templates of the zeolite has a reduced BET surface area and microporosity compared to samples 1 and 3 even with an additional amount of CVD period (4 hours versus 2 or 3). Although not wanting to be limited by theory, it is believed that the carbon template of the zeolite formed using LCaX-873-4 did not sufficiently interconnect at the CVD temperature of 873 K during the 4 hour CVD period. This indicates that the zeolite micropores are fully filled with deposited carbons that have some bonding but not with a significantly interlaced 3-dimensional (3-D) structure. Upon removal of the sacrificial zeolite using the aqueous strong mineral acid mixture, the resultant carbon template of the zeolite structure collapsed and was otherwise unusable as a structured adsorbent.

Performing the same operation and adding a post-CVD thermal treatment for four hours under a helium atmosphere at 1123 K before removal of the zeolite framework (LCaX-873-4H, sample number 5) improves not only the surface area of the methane microporous carbon adsorbent over the carbon template of the zeolite by a factor of 3.6 but also increases the micropore volume by a factor of 3.4 versus sample number 4. These findings were unexpected and further explored as disclosed.

Table 3 shows that additional post-CVD thermal treatment of the carbon-zeolite composite, either through a post-CVD heat treatment (sample number 5) or a secondary CVD treatment with another post-CVD heat treatment (sample numbers 6-9) when using a reduced CVD temperature (<900 K), provides a highly microporous structure in the methane microporous carbon adsorbent that has adequate structural integrity for removal of the sacrificial large crystal zeolite without collapsing.

Comparing the results of methane microporous carbon adsorbent sample numbers 6-8 with methane microporous carbon adsorbent sample number 5 from Table 3, there is a reduction in the mesopore volume for sample numbers 6-8 while comparatively maintaining the BET specific surface area and micropore volume. Sample numbers 6-8 have a micropore:mesopore volume ratio in a range of from about 4.7 to about 6.5, which is an improvement over the volume ratio of about 2.5 for sample number 5. Sample number 6 (LCaX-873-4H4H) has a reduced mesopore volume (0.23 $cm^3/g$) compared to sample number 5 (LCaX-873-4H; 0.45 $cm^3/g$) just with the performance of a second acetylene CVD/post-CVD thermal treatment cycle before removing the zeolite template.

Methane microporous carbon adsorbent sample number 5, LCaX-873-4H, has a greater surface area (3049 $m^2/g$), micropore volume (1.12 $cm^2/g$) and micropore:mesopore volume ratio (2.49) than that of carbon template of the zeolite sample number 1 (LCaX-1023-2). Comparatively, this indicates that the reduction of the CVD temperature, lengthening the CVD period and applying a post-CVD thermal treatment results in an improved negative replica of the large zeolite. The methane microporous carbon adsorbent of LCaX-873-4H shows the greatest total pore volume (1.57 $cm^3/g$) of all the samples.

The result indicates that incomplete filling of zeolite micropores with the organic precursor before the carbon is thermally deposited leads to the formation of mesopores in the carbon templates of the zeolite. The sequential carbon synthesis method allows a reliable means of producing and reproducing methane microporous carbon adsorbents regardless of the zeolite amount (that is, bed thickness) used. Compare sample numbers 6 and 7, which use 1 gram and 5 grams of material, respectively.

Decreasing the acetylene CVD temperature to 823 K and increasing the first CVD period, a methane microporous carbon adsorbent with slightly enhanced BET surface area and micropore volume is synthesized (sample number 8; LCaX-823-9H4H). Methane microporous carbon adsorbent sample numbers 5-8 indicate that a CVD temperature in in a range of from about 800 K to about 900 K provides an appropriate combination of both dispersion of acetylene and carbonization not only into small amounts of the large CaX zeolites but also into layered beds of the sacrificial zeolites (sample numbers 7 and 8). Lengthening the CVD period within the limited lower temperature range appears to improve the BET specific surface and the micropore:mesopore ratio. Although not intending to be limited by theory, it is believed that the acetylene more thoroughly penetrates into the pore structure and forming the first carbon template of the zeolite before the first thermal treatment cycle. At a CVD temperature less than 773 K using acetylene, the carbon template of the zeolite forms within the carbon-zeolite composite, but the process requires a CVD period that is not practical for commercial methane microporous carbon adsorbent production.

Figure 11:
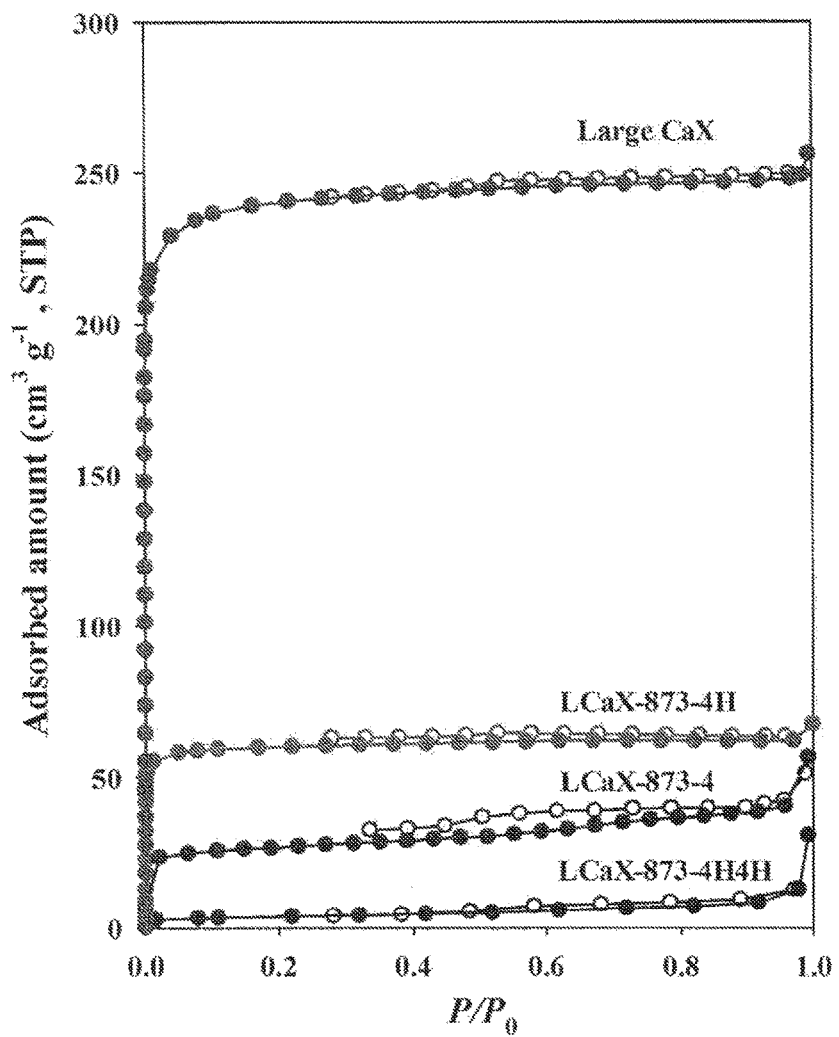
FIG. 11 is a graph showing traces of nitrogen adsorption-desorption isotherms for the LCaX zeolite, a carbon-zeolite composite, thermally-treated carbon-zeolite composites, and the resultant methane microporous carbon adsorbent.

FIG. 11 is a graph showing traces of nitrogen adsorption-desorption isotherms for the LCaX zeolite, a carbon-zeolite composite, thermally-treated carbon-zeolite composites, and the resultant methane microporous carbon adsorbent. Isotherms for the LCaX zeolite, the carbon-zeolite composite for Sample 4, the thermally-treated carbon-zeolite for Sample 5, and the methane microporous carbon adsorbent that is Sample 6 are represented. The nitrogen isotherms are performed at different points along the carbonization and thermal treatment process. Except for a pristine large CaX zeolite, that is, prior to carbon deposition using acetylene, the carbon template of the zeolite—both pre- and post-thermal treatment—is maintained within the zeolite; the zeolite is not removed during isothermal testing.

FIG. 11 shows pristine LCaX zeolite having the greatest adsorbed amount, but this is obvious as it has fully-open zeolite pores. Sample number 4 (LCaX-873-4) carbon-zeolite composite shows that after a CVD period of 4 hours at a CVD temperature of 873 K using acetylene, the adsorption capacity of the carbon-zeolite composite is reduced by about 80% (measuring at $P/P_0=1$). The adsorption amount drops because the pores of the zeolite are clogged with deposition carbon in the carbon-zeolite composite. Sample number 5 (LCaX-873-4H) is a thermally-treated carbon-zeolite composite that is thermal treated at 1123 K for four hours under a helium atmosphere. The process appears to have regenerated about 25% of the LCaX zeolite micropore volume. The thermal treatment also appears to have increased the density of the carbon template of the zeolite within the thermally-treated carbon-zeolite composite. The thermally-treated carbon template of the zeolite forms a more interlinked carbon-carbon structure, which causes the carbon network within the zeolite to shrink. This permits more nitrogen to penetrate into the thermally-treated carbon-zeolite template (LCaX-873-4H).

Because many of the zeolite micropores are regenerated after the post-CVD thermal treatment (the deposited carbon dehydrogenates and the network of interlaced carbons physically shrinks as carbon-carbon bonding becomes more prevalent), a second acetylene CVD/post-CVD thermal treatment cycle penetrates the carbon-zeolite composite and fills the newly exposed and remaining micropores. After performing the second acetylene CVD/post-CVD thermal treatment cycle, the micropores of the carbon-zeolite composite sample number 6 (LCaX-873-4H4H) are almost filled with the thermally-treated carbon template of the zeolite. Using the data previously presented in Table 3, the micropore:mesopore volume ratio is greater than 4 for LCaX-873-4H4H.

Figure 12:
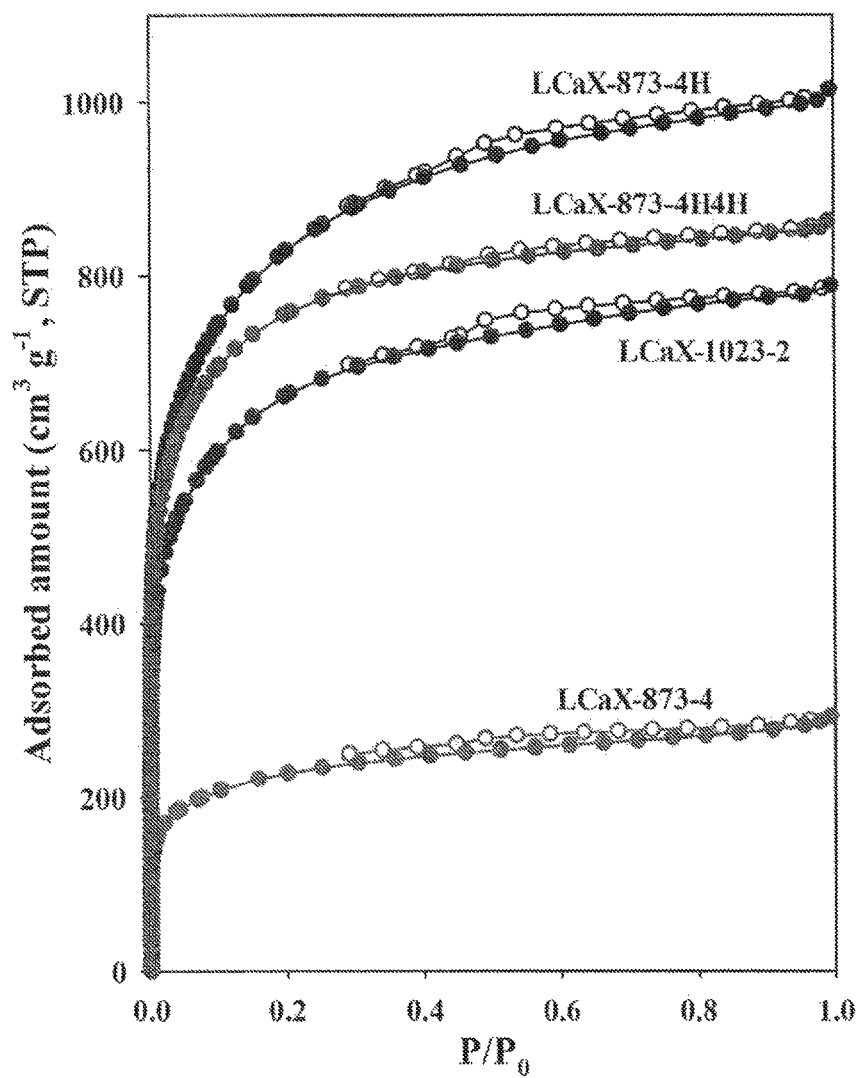
FIG. 12 is a graph showing traces of nitrogen adsorption-desorption isotherms for carbon templates of the zeolite made from LCaX-1023-2 and LCaX-873-4 and two methane microporous carbon adsorbents made from LCaX-873-4H and LCaX-873-4H4H.
Figure 13:
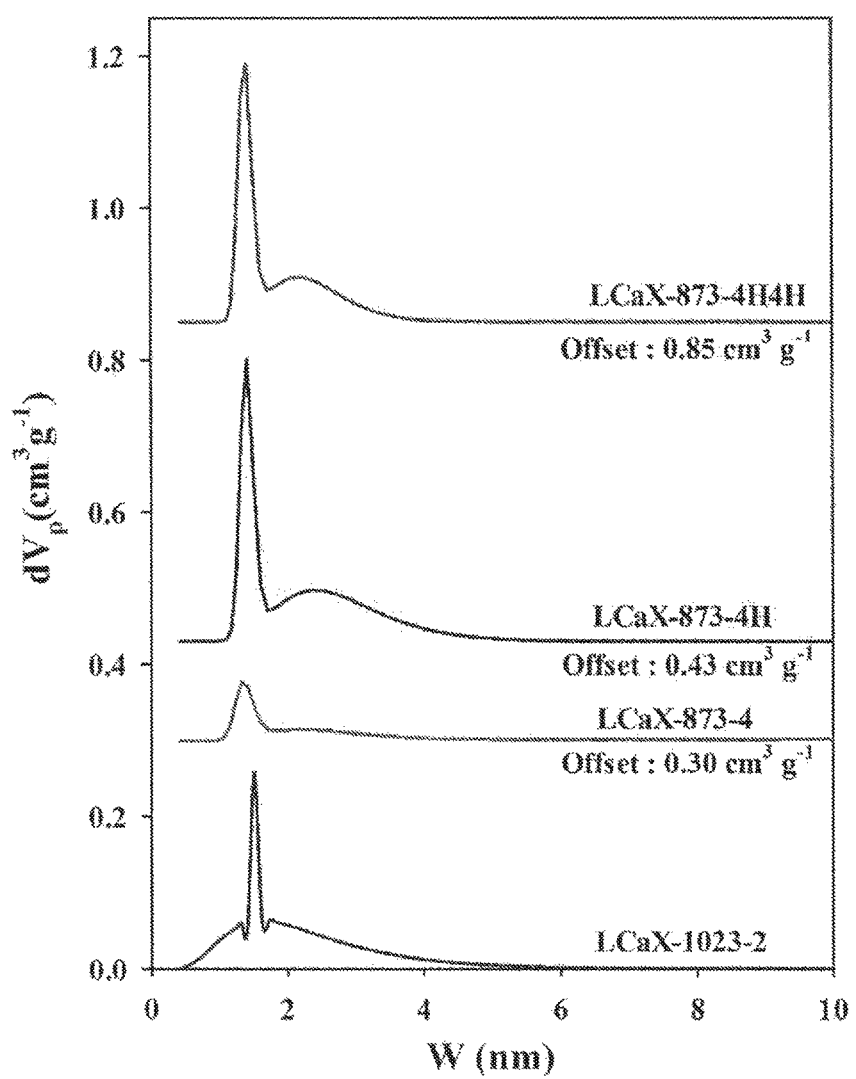
FIG. 13 is a graph showing traces of the determined pore size distribution using the non-local density function theory (NLDFT) algorithm on the nitrogen adsorption-desorption isotherm data shown in FIG. 12.
Figure 14:
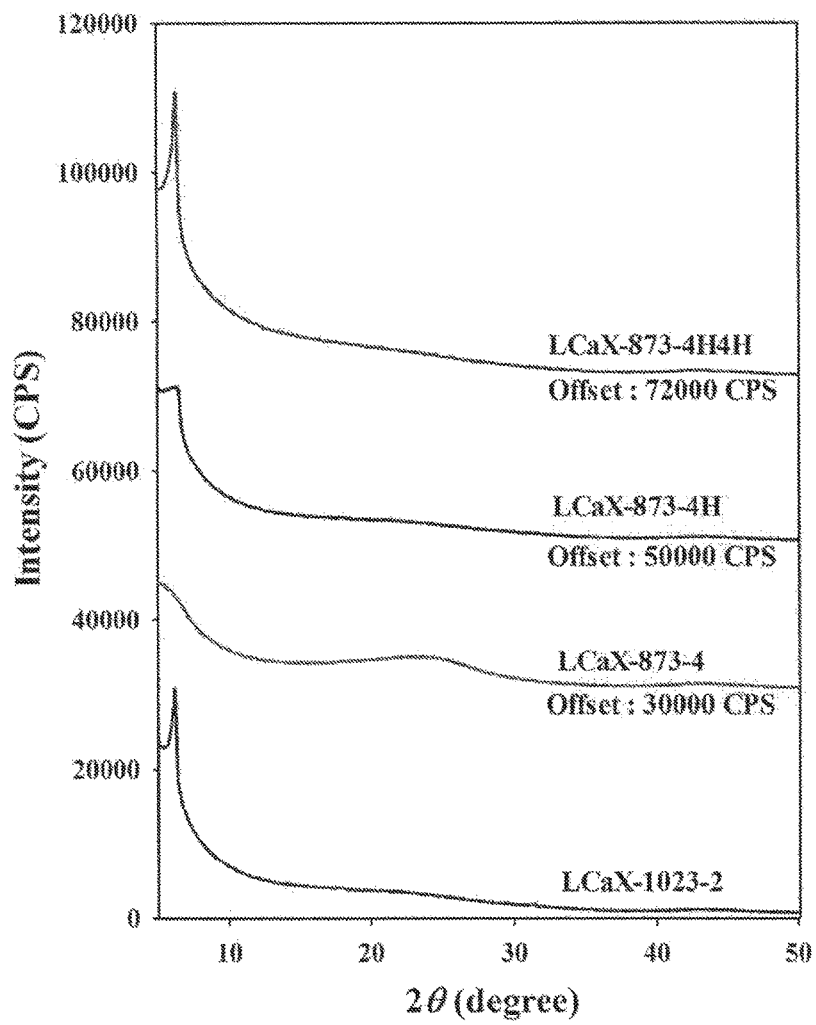
FIG. 14 is a graph showing traces of the XRD analysis for carbon templates of the zeolite made from LCaX-1023-2 and LCaX-873-4 and methane microporous carbon adsorbents made from LCaX-873-4H and LCaX-873-4H4H.

FIGS. 12-14 show analysis of two types of the methane microporous carbon adsorbents and two carbon templates of the zeolite using LCaX as the zeolite template and acetylene as the organic precursor. Each is made using 5 grams of the LCaX zeolite. FIG. 12 is a graph showing traces of nitrogen adsorption-desorption isotherms for carbon templates of the zeolite made from LCaX-1023-2 and LCaX-873-4 and two methane microporous carbon adsorbents made from LCaX-873-4H and LCaX-873-4H4H. FIG. 13 is a graph showing traces of the determined pore size distribution using the non-local density function theory (NLDFT) algorithm on the nitrogen adsorption-desorption isotherm data shown in FIG. 12. Note that for the sake of clarity in FIG. 13 that the individual traces of carbon template of the zeolite using LCaX-873-4, and the methane microporous carbon adsorbents LCaX-873-4H and LCaX-873-4H4H, are offset by a fixed value of $dV_p$ in $cm^3/g$. In reality, all four traces have a similar value at W=0 nm. The trace for LCaX-873-4 is offset by 0.30 $cm^3/g$; the trace for LCaX-873-4H is offset by 0.43 $cm^3/g$; the trace for LCaX-873-4H4H is offset by 0.85 $cm^3/g$. FIG. 14 is a graph showing traces of the XRD analysis for carbon templates of the zeolite made from LCaX-1023-2 and LCaX-873-4 and methane microporous carbon adsorbents made from LCaX-873-4H and LCaX-873-4H4H. Note that for the sake of clarity in FIG. 14 that the individual traces of LCaX-873-4, LCaX-873-4H and LCaX-873-4H4H offset by a fixed value of Intensity in CPS. In reality, all three traces have a similar value at 2θ=0. The trace for LCaX-873-4 is offset by 30000 CPS; the trace for LCaX-873-4H is offset by 50000 CPS; the trace for LCaX-873-4H4H is offset by 72000 CPS.

The most precise negative replica of the LCaX zeolite structure (LCaX-873-4H4H) appears to show a classic Type I isotherm and nearing saturation at a reduced nitrogen partial pressure ($P/P_0 > 0.1$) in FIG. 12. The LCaX zeolite with no deposited carbon shows a similar Type I isotherm curve in FIG. 11. The methane microporous carbon adsorbent formed by LCaX-873-4H, which is synthesized in a single cycle of acetylene CVD/post-CVD thermal treatment, shows a comparatively greater total pore volume than the double-cycled LCaX-873-4H4H methane microporous carbon adsorbent in FIG. 12. FIG. 12 shows that a large amount of adsorption for the LCaX-873-4H methane microporous carbon adsorbent occurs in a partial pressure range of $P/P_0 > 0.1$. FIG. 13 confirms that the increased adsorption amount by LCaX-873-4H methane microporous carbon adsorbent is due to the presence of additional pore volume in the mesopore range (the rounded hump that spreads along the track at values >2 nm, which indicates pore sizes outside of the micropore range)

The methane microporous carbon adsorbents (LCaX-873-4H and LCaX-873-4H4H) show in FIG. 13 a large spike (narrow, intense) in pore size distribution in the micropore regime (W<2 nm). FIG. 14 shows that the carbon templates of the zeolite and methane microporous carbon adsorbents that performed well either have a great CVD temperature and no post-CVD treatment (LCaX-1023-2) or have at least one post-CVD thermal treatment cycle (LCaX-873-4H, LCaX-873-4H4H) show a response in intensity at about 2θ=6.3° in the XRD trace. The methane microporous carbon adsorbent from LCaX-873-4H4H shows a very sharp peak at this value. This indicates that the adsorbent has an ordered microporous structure very similar to the template zeolite (see FIG. 5 for the large NaX zeolite having a TEA (n=3); FIG. 8 for a similar bump for the commercial-grade sized ion-exchanged CaX replicas). The presence of the sharp XRD intensity peak at 2θ=6.3° is useful for indicating the precision of the negative replication of the sacrificial zeolite structure (that is, efficiency of carbon deposition and thermal treatment).

Forming Methane Microporous Carbon Adsorbents from Commercial BEA and Commercial-Grade Sized CaX Zeolites A commercial BEA zeolite is obtained from Zeolyst Int'l (Conshohocken, Pa.) having a Si:Al molar ratio of about 19. The BEA zeolite is a round-shaped particle with a size distribution in a range of from about 500 nm to about 1 μm. A CaX zeolite (commercial-grade sized (1-2 μm) $Ca^{+2}$ ion-exchanged NaX zeolite) is also used and is manufactured as previously described. Each zeolite goes through a similar sequential carbon synthesis method: a first CVD process using acetylene at a CVD temperature of 823 K for a first CVD period of 9 hours, a first post-CVD thermal treatment in a helium atmosphere at 1123 K for four hours, a second CVD with acetylene at a CVD temperature of 823 K for a second CVD period of 4 hours, a second post-CVD thermal treatment in a helium atmosphere at 1123 K for four hours. The sacrificial zeolite frameworks are etched away in several aqueous strong mineral acid mixture washes. The resultant methane microporous carbon adsorbents are recovered. Testing on the methane microporous carbon adsorbents are presented in Table 4.

TABLE 4

Pore structure and surface area properties of the methane microporous carbon adsorbents formed from BEA and commercial-grade sized CaX zeolites.

| Sample | $S_{BET}$[1] (m²/g) | $V_{micro}$[2] (cm³/g) | $V_{meso}$ (cm³/g) | $V_{total}$ (cm³/g) |
|---|---|---|---|---|
| CaX-823-9H4H | 2933 | 1.18 | 0.28 | 1.46 |
| BEA-823-9H4H | 2940 | 1.19 | 0.31 | 1.50 |

[1]Brunauer-Emmett-Teller (BET) specific surface area.
[2]Micropore volume ($V_{micro}$) calculated using D-R equation.

FIG. 15 shows SEMs of (a) BEA crystalline zeolite and (b) methane microporous carbon adsorbents made using the BEA zeolite. (a) of FIG. 15 is a SEM of the commercially-obtained BEA zeolite. (b) of FIG. 15 is a SEM of the methane microporous carbon adsorbents made using the commercially-obtained BEA zeolite of SEM (a).

Both methane microporous carbon adsorbents given Table 4 show high BET specific surface area (about 3000 m²/g) as well as micropore volume (about 1.2 cm³/g). The methane microporous carbon adsorbent formed from CaX has a micropore:mesopore volume ratio of 4.21. The methane microporous carbon adsorbent formed from BEA has a micropore:mesopore volume ratio of 3.84.

Figure 16:
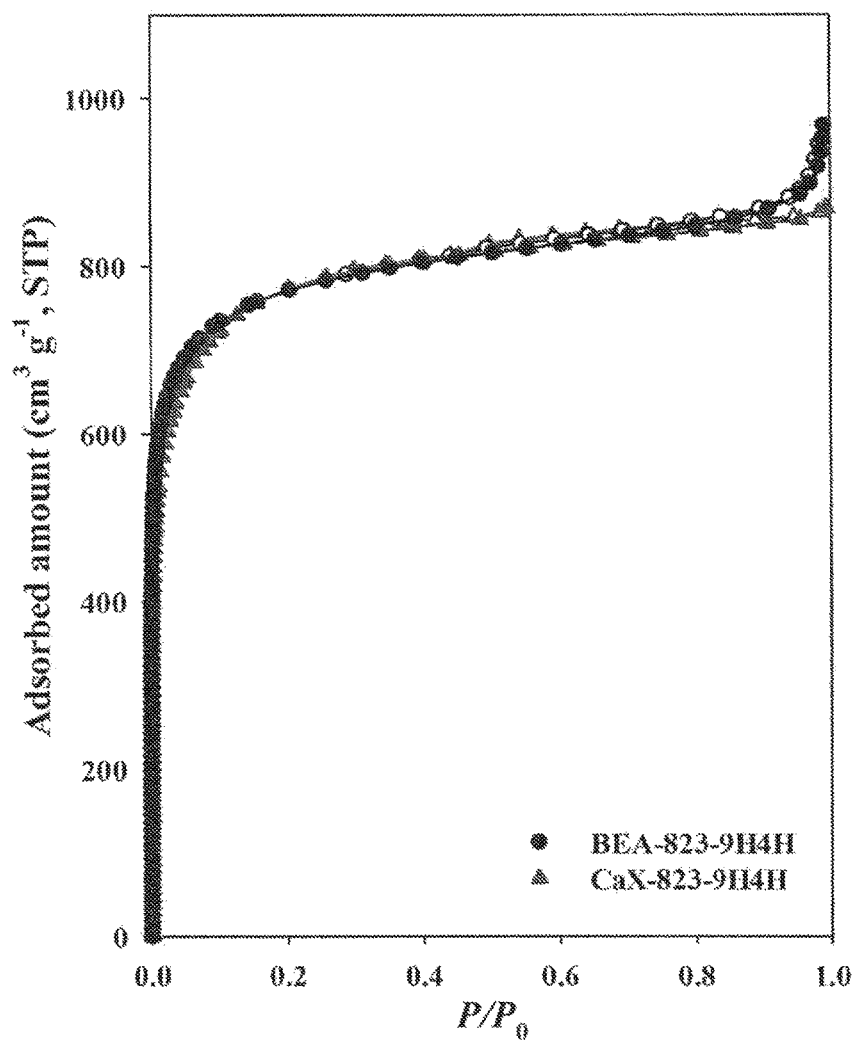
FIG. 16 is a graph showing traces of nitrogen adsorption-desorption isotherms for the methane microporous carbon adsorbent made from CaX and BEA zeolites.
Figure 17:
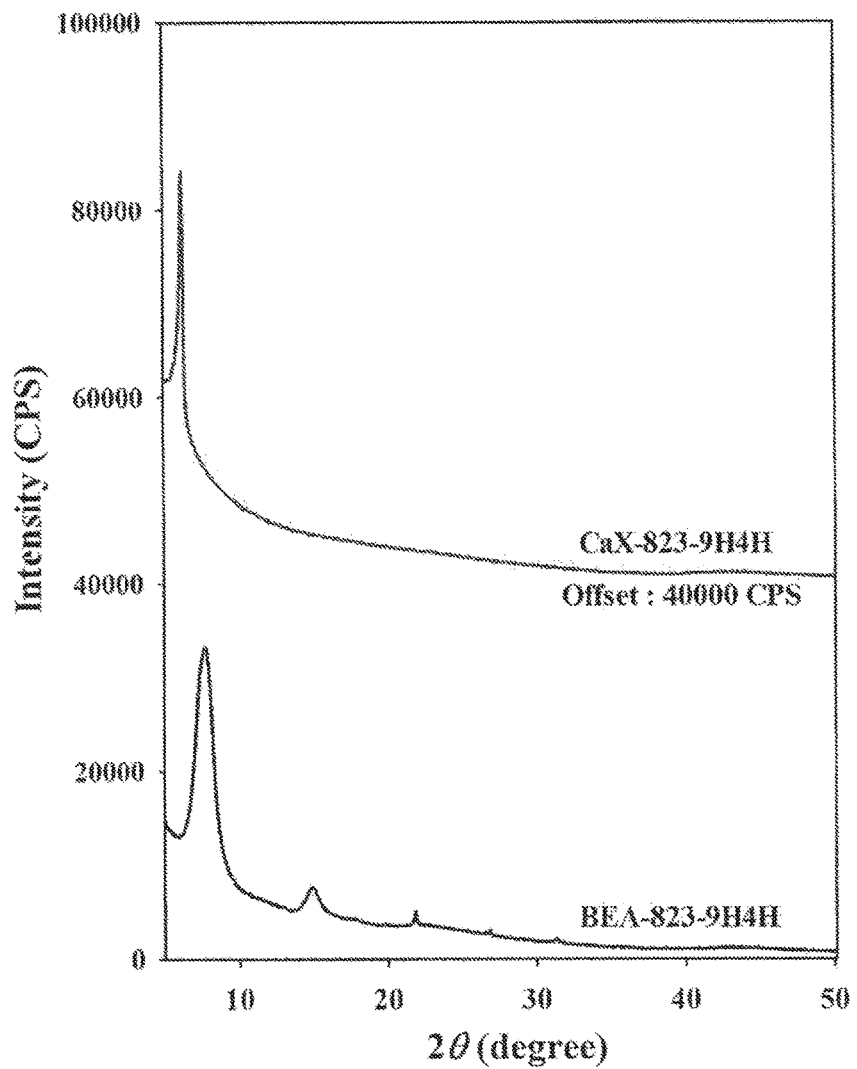
FIG. 17 is a graph showing traces of the XRD analysis for the methane microporous carbon adsorbent made from the CaX and BEA zeolites.

FIGS. 16 and 17 show analysis of both types of methane microporous carbon adsorbent given in Table 4. FIG. 16 is a graph showing traces of nitrogen adsorption-desorption isotherms for the methane microporous carbon adsorbent made from CaX and BEA zeolites. Both materials show Type I $N_2$ adsorption-desorption isotherms. FIG. 17 is a graph showing traces of the XRD analysis for the methane microporous carbon adsorbent made from the CaX and BEA zeolites. Note that for the sake of clarity in FIG. 17 that the individual trace of CaX-823-9H4H is offset by a fixed value of Intensity in CPS. In reality, the traces have a similar value at 2θ=0. The trace for CaX-823-9H4H is offset by 40000 CPS. FIG. 17 shows very sharp XRD peak in the low angle regime (2θ<10°). Both FIGS. 17 and 18 as well as the ratio of micropore:mesopore volume each indicate that the methane microporous carbon adsorbents are negative replicas that closely resemble each of their sacrificial zeolite in ordered micropore structure.

Figure 18:
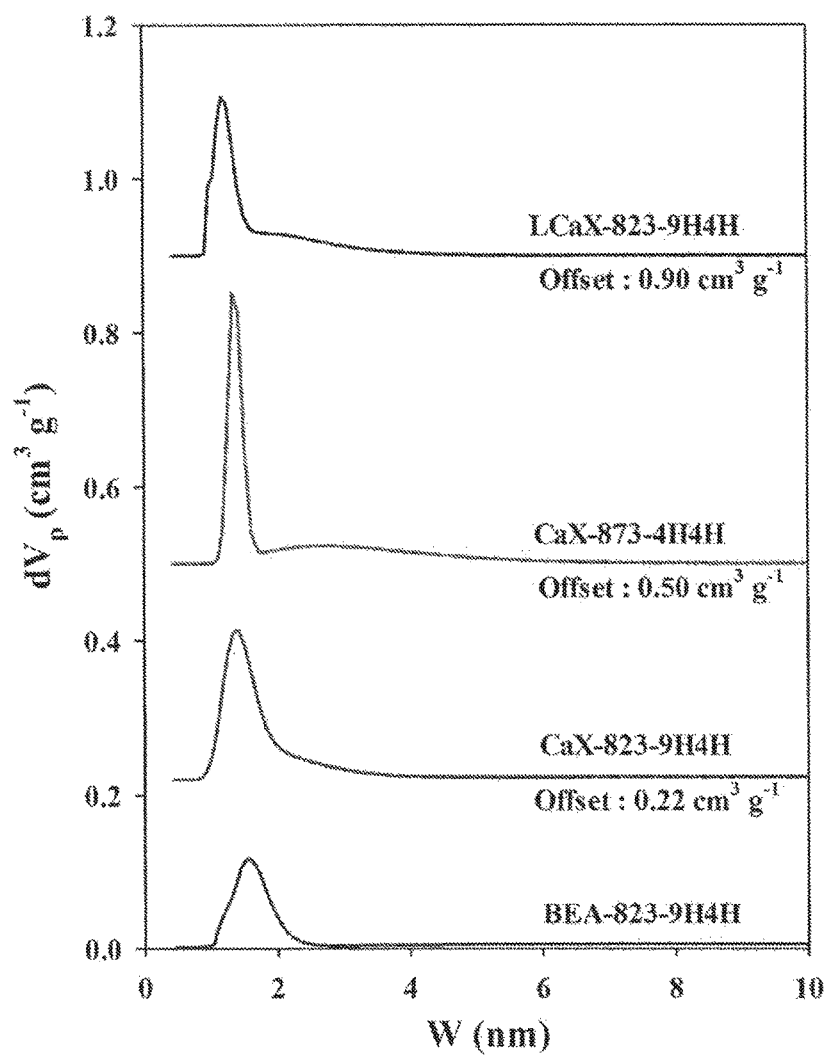
FIG. 18 is a graph showing traces of the determined pore size distribution using the NLDFT algorithm for four methane microporous carbon adsorbents formed using two acetylene CVD/post-CVD thermal treatment cycles.

FIG. 18 is a graph showing traces of the determined pore size distribution using the NLDFT algorithm for four methane microporous carbon adsorbents formed using two acetylene CVD/post-CVD thermal treatment cycles. Note that for the sake of clarity in FIG. 18 that the individual traces for CaX-823-9H4H, CaX-873-4H4H and LCaX-823-9H4H are offset by a fixed value of $dV_p$ in cm³/g. In reality, all four traces have a similar value at W=0 nm. The trace for CaX-823-9H4H is offset by 0.22 cm³/g; the trace for CaX-873-4H4H is offset by 0.50 cm³/g; the trace for LCaX-823-9H4H is offset by 0.90 cm³/g. FIG. 18 shows four different negative replicas using three different sacrificial zeolites, two different CVD temperatures, and two different first CVD periods. FIG. 18 demonstrates is that all four methods—even with different small pore zeolites, CVD temperature and CVD period—show a very narrow pore size distribution in the micropore range. FIG. 18 also shows that the mesopore pore range for these methane microporous carbon adsorbent is relatively insignificant.

The results of this experiment indicate that other crystalline zeolite structures may be used as sacrificial templates for forming the methane microporous carbon adsorbent. The experiments have shown that NaX, CaX and BEA zeolites are useful in forming the methane microporous carbon adsorbent. FAU, which include the commercial-grade sized NaX, the large NaX (LNaX), the large and commercial-grade sized ion-exchanged NaX (CaX and LCaX), and NaY; EMT, which is similar to FAU; and BEA zeolite structures are all 12-membered ring structures and have 3-dimensional pore connectivity, which are suitable to act as the framework for forming the 3-dimensional negative replica. In an embodiment of the method, the crystalline zeolite is selected from the group consisting of FAU, EMT and BEA zeolite structures. In an embodiment of the methane microporous carbon adsorbent, the shape is in the form of the negative replica of a crystalline zeolite that is selected from the group consisting of FAU, EMT, BEA zeolite structures, and combinations of the zeolite structures.

Comparative Methane Adsorption for Several Carbon Adsorbents

Figure 19:
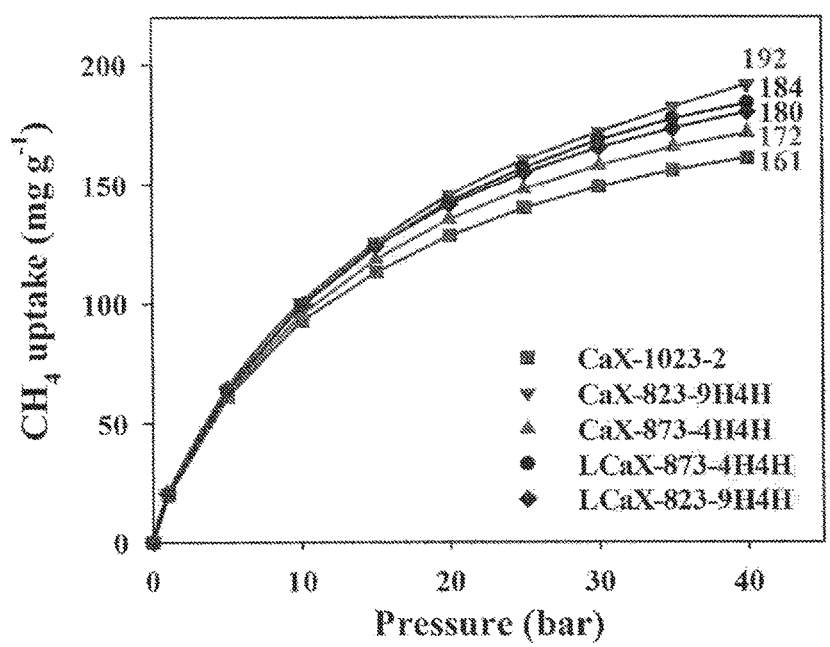
FIG. 19 is a graph showing several traces of the methane adsorption-desorption isotherms on a gravimetric basis for a carbon templates of the zeolite and several methane microporous carbon adsorbents at 298 K.

Wang provides a description of the testing procedures and the apparatus for determining the gravimetric basis for adsorption isotherms. FIG. 19 is a graph showing several traces of the methane adsorption isotherms on a gravimetric basis for a carbon template of the zeolite and several methane microporous carbon adsorbents at 298 K. Each carbon template of the zeolite and the methane microporous carbon adsorbents are manufactured using the code provided in FIG. 19 described supra. The evaluation pressure range is from about 0 to about 40 bar. The evaluation temperature is maintained at 298 K. The value provided at the end of each isotherm trace is the "$CH_4$ stored" value. As shown in FIG. 19, the methane microporous carbon adsorbent from CaX-823-9H4H, which does not use large crystal zeolite, has the greatest methane stored value on a weight basis. The greater CVD temperature with no post-thermal treatment carbon template of the zeolite—CaX-1023-2—has a relatively reduced methane stored value at 40 bar pressure compared to the methane microporous carbon adsorbents.

Table 5 shows the storage properties of the carbon template of the zeolite, the five methane microporous carbon adsorbents, and two known commercial activated carbon adsorbents. "Maxsorb® 3000" (Kansai Coke and Chemicals Co., Ltd; Japan) is a carbon material (about 3000 m$^2$/g) that is activated by exposure to a solution of potassium hydroxide (KOH). "SRD-08016" is an activated powdered carbon material supplied from Chemviron Carbon (Feluy, Belgium).

FIG. 20 shows SEMs (a)-(b) of methane microporous carbon adsorbents made using calcium-ion substituted X zeolites. (a) of FIG. 20 is a SEM of methane microporous carbon adsorbents made using a NaX calcium-ion substituted zeolite (CaX). (b) of FIG. 20 is a SEM of methane microporous carbon adsorbents made using an LNaX calcium-ion substituted zeolite (LCaX). In an embodiment of the adsorbent, the shape is orthogonal with a mid-edge length in a range of 8 μm to 20 μm. As both SEMs (a)-(b) of FIG. 20 show, the ion-exchange of $Ca^{2+}$ in the NaX and LNaX zeolites did not affect the octahedral particle morphology of the resultant methane microporous carbon adsorbents formed from CaX and LCaX. Instead, it appears that on the "macro" level to be a negative replica of the sacrificial crystalline zeolite.

Table 5 shows that Maxsorb®, the carbon template of the zeolite, and the five methane microporous carbon adsorbents retain an amount of methane in a range of from about 10 wt. % to about 12 wt. % residual amount of $CH_4$ at 1 bar. The "delivered $CH_4$" amount represents the amount of methane that is adsorbed and released between cycles of 1 bar and 40 bar, and is determined by subtracting the adsorption amount detected at 1 bar from the adsorption amount detected at 40 bar.

Both packing and tap densities are used for calculating the volumetric $CH_4$ adsorption amounts of the methane microporous carbon adsorbents. The five methane microporous carbon adsorbents and the carbon template of a zeolite given in Table 5 show similar methane adsorption amounts on a gravimetric basis (FIG. 19), but the determined volumetric values are different due to deviations in packing and tap densities. Deviations appear more significant for tap density. Although not intending to be limited by theory, the methane microporous carbon adsorbents forming from the large sacrificial zeolite particles (LCaX series) show greater overall methane adsorption volume capacity than the materials created from the smaller sacrificial zeolite particles (CaX series). On a gas volume basis, therefore, the LCaX formed methane microporous carbon adsorbents that provide greater methane adsorption even at a reduced volume density than the CaX formed methane microporous carbon adsorbents and the carbon template of the zeolite.

Methane microporous carbon adsorbents manufactured using LCaX-823-9H4H and LCaX-873-4H4H according to Table 5 have a greater methane adsorption volume capacity in a range of from about 10 vol. % to about a 20 vol. % on either a packing density or a tap density basis compared to Maxsorb® 3000.

TABLE 5

Pore structure and surface area properties as well as determined methane adsorption properties of several commercial activated carbon materials, a carbon template of a zeolite, and several methane microporous carbon adsorbents.

| Sample | $S_{BET}$ (m$^2$/g) | $V_{micro}$ (cm$^3$/g) | $CH_4$ stored (mg/g) | $CH_4$ retained 1 bar (wt. %) | $CH_4$ deliv. (mg/g) | $CH_4$ deliv. (v/v)[1] | $CH_4$ deliv. (v/v)[2] |
|---|---|---|---|---|---|---|---|
| Maxsorb ® 3000 | 3180 | 1.31 | 180 | 10 | 162 | 102 | 89 |
| SRD-08016 | 1840 | 0.74 | 124 | 16 | 104 | 86 | 76 |
| CaX-1023-2 | 2567 | 0.95 | 161 | 12 | 142 | 103 | 71 |
| CaX-823-9H4H | 2933 | 1.15 | 192 | 11 | 171 | 104 | 73 |
| CaX-873-4H4H | 2631 | 1.06 | 172 | 11 | 152 | 109 | 67 |
| LCaX-823-9H4H | 2950 | 1.17 | 180 | 11 | 160 | 122 | 103 |
| LCaX-873-4H | 3049 | 1.12 | 174 | 12 | 153 | 105 | 73 |
| LCaX-873-4H4H | 2840 | 1.10 | 184 | 11 | 164 | 123 | 103 |

[1]Delivered $CH_4$ amount calculated based on packing density.
[2]Delivered $CH_4$ amount calculated based on tap density.

Forming Negative Carbon Replicas of Commercial NaX Zeolite

Table 1 shows that a commercial-grade NaX zeolite has a lower thermal stability than an ion-exchanged CaX zeolite ($T_{init}$), and the discussion regarding Table 1 indicates that NaX zeolites may be unsuitable for forming methane microporous carbon adsorbents. Using a sequential carbon synthesis method having a CVD temperature that is less than 900 K, however, provides an opportunity to reexamine this assumption. Table 6 shows two methane microporous carbon adsorbents: One made with CaX zeolite and one made with NaX zeolite.

TABLE 6

Pore structure and surface area properties of two methane microporous carbon adsorbents formed from commercial-grade sized NaX and CaX zeolites.

| Sample | $S_{BET}$[1] (m$^2$/g) | $V_{micro}$[2] (cm$^3$/g) | $V_{meso}$ (cm$^3$/g) | $V_{total}$ (cm$^3$/g) |
|---|---|---|---|---|
| CaX-823-9H4H | 2933 | 1.18 | 0.28 | 1.46 |
| NaX-823-4H2H | 2974 | 1.18 | 0.23 | 1.41 |

[1]Brunauer-Emmett-Teller (BET) specific surface area.
[2]Micropore volume ($V_{micro}$) calculated using D-R equation.

The post-CVD thermal treatment is performed twice for four hours at 1123 K on the NaX zeolite. Although not wanting to be limited by theory, it is believed that the deposited carbon structure within the NaX zeolite after CVD has sufficient strength to support the carbon-NaX zeolite composite even during the thermal treatment post-CVD process such that the NaX zeolite framework remains intact and does not degrade. The connected thermally-treated carbons in and between the micropores of the NaX zeolite internally stabilizes the zeolite structure while the carbon becomes denser during the post-CVD treatment process. Table 6 shows that the methane microporous carbon adsorbent from the NaX zeolite is very close to the 3000 m$^2$/g BET specific surface area value that one of ordinary skill in the art may describes as a "super adsorbent" (≥3000 m$^2$/g).

Based upon the data presented in Tables 1-6 and FIGS. 2-22, in an embodiment of the methane microporous carbon adsorbent the BET specific surface area is in a range of from about 2500 m$^2$/g to about 3100 m$^2$/g. In an embodiment of the adsorbent, the micropore volume is in a range of from 0.95 cm$^3$/g to 1.19 cm$^3$/g as determined by the Dubinin-Radushkevich equation. In an embodiment of the adsorbent, the micropore to mesopore volume ratio is in a range of from 4 to 6. In an embodiment of the adsorbent, the stored methane value is in a range of from 172 mg/g to 192 mg/g. In an embodiment of the adsorbent, the methane delivered value is a range of from 152 mg/g to 171 mg/g in a pressure range from 1 bar to 40 bar.

Figure 21:
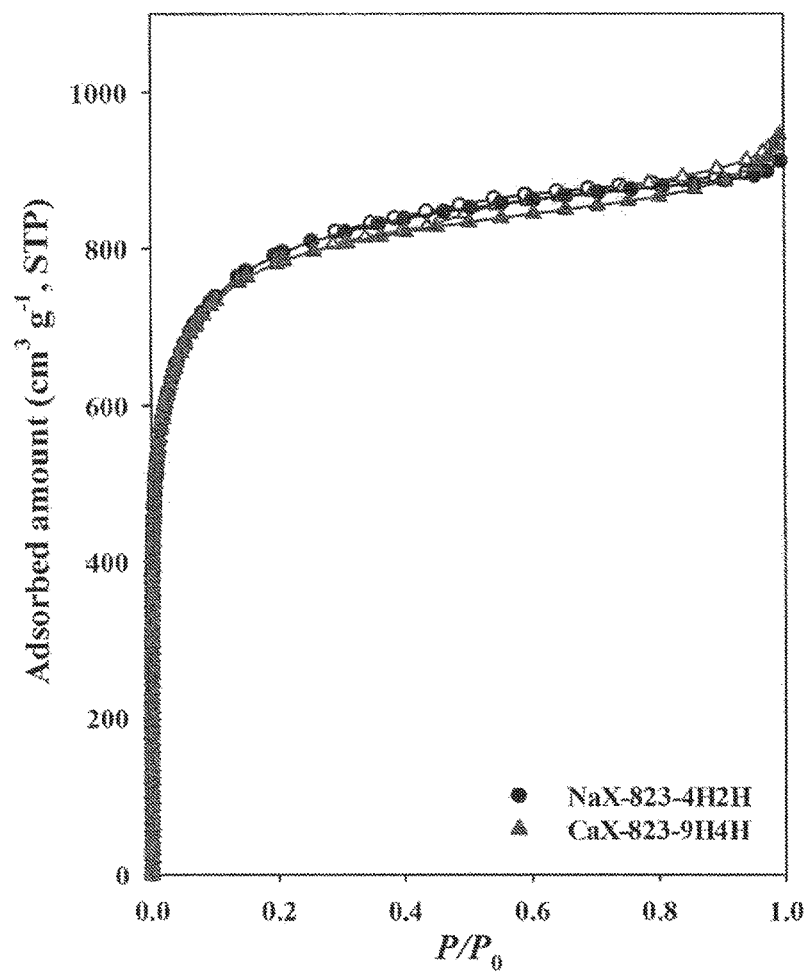
FIG. 21 is a graph showing traces of nitrogen adsorption-desorption isotherms for the methane microporous carbon adsorbents formed using CaX and NaX zeolites.
Figure 22:
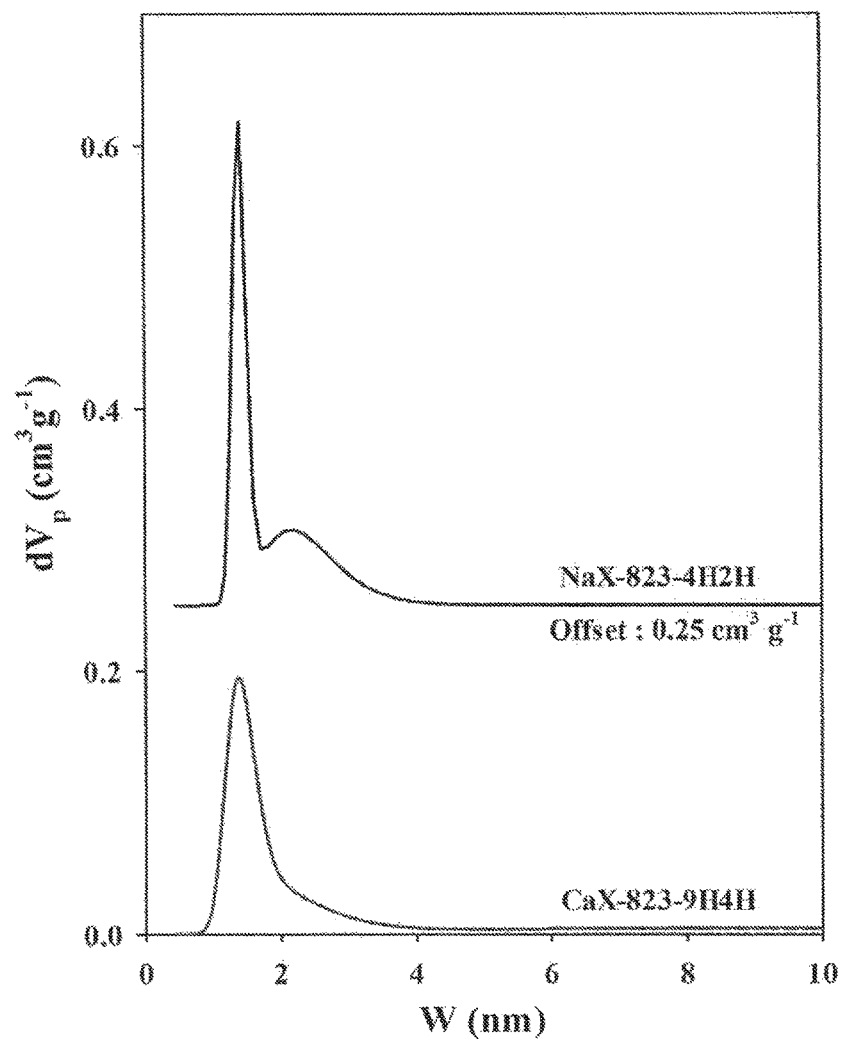
FIG. 22 is a graph showing traces of the determined pore size distribution using the non-local density function theory (NLDFT) algorithm on the nitrogen adsorption-desorption isotherm data shown in FIG. 21.

FIGS. 21 and 22 show analysis of both types of methane microporous carbon adsorbents given in Table 6. FIG. 21 is a graph showing traces of nitrogen adsorption-desorption isotherms for the methane microporous carbon adsorbents formed from CaX and NaX zeolites. Both methane microporous carbon adsorbents show Type I N$_2$ adsorption-desorption isotherms. FIG. 22 is a graph showing traces of the determined pore size distribution using the non-local density function theory (NLDFT) algorithm on the nitrogen adsorption-desorption isotherm data shown in FIG. 21. Note that for the sake of clarity in FIG. 22 the individual trace of NaX-823-4H2H is offset by a fixed value of $dV_p$ in cm$^3$/g. In reality, the traces have the same value at W=0. FIG. The trace for NaX-823-4H2H is offset by 0.25 cm$^3$/g. In reality, all traces have the same value at 2θ=0. FIG. 22 shows the methane microporous carbon adsorbent made from the NaX zeolite having a strong spike in the range of from about 1 nm to about 2 nm pore width. FIG. The micropore:mesopore volume ratio for the methane microporous carbon adsorbents using the NaX zeolite is about 5.13, which is within the range of methane microporous carbon adsorbents made from CaX and LCaX given in Table 3 and discussed supra.

FIG. 23 shows SEMs (a)-(b) of methane microporous carbon adsorbents made using sodium X zeolites. (a) of FIG. 23 is a SEM of methane microporous carbon adsorbents made using a commercial-grade sized NaX zeolite. (b) of FIG. 23 is a SEM of methane microporous carbon adsorbents made using a LNaX zeolite. The size difference of the zeolite material does not affect the octahedral particle morphology. In comparing (a)-(c) of FIG. 6 with (a)-(b) of FIG. 23, one can observe that the change in size does not affect the octahedral shape or the ability to adsorb the organic precursor for forming the methane microporous carbon adsorbents.

Scaled Synthesis of Methane Microporous Carbon Adsorbents Using Commercial-Grade Size NaX Zeolite The rotary tubular furnace shown in FIG. 2 is used to perform scaled synthesis of methane microporous carbon adsorbents for amounts greater than 1-5 grams from commercial-grade NaX zeolites. The size of the commercial-grade NaX zeolites is such that the mid-edge length is about 2 µm. About 50 grams of the commercial-grade sized NaX zeolite and about 50 grams of cleansed sea sand (washed in deionized water; particle sizes of about 15 to about 20 mesh) are introduced into the cylindrical stainless-steel container located in the center of the tubular furnace. The sea sand is used to help solids mixing and to keep the NaX zeolites from sticking together during carbon vapor deposition and thermal treatment. The cylindrical container is purged with argon (a non-reactive gas), the cylindrical container rotated and the temperature within the cylindrical container ramped up to 823 K. As the container rotates, the NaX zeolite and the sea sand particles not only collide with one another but also the internal baffles of the cylindrical container, causing the zeolite crystals to be dropped through the atmosphere contained within the cylindrical container every few seconds. Upon reaching the first CVD temperature of 823 K, an organic precursor gas that is a mixture of 4 vol. % acetylene in argon (Ar) is introduced into the cylindrical stainless-steel container at a flow rate of about 1000 mL/minute and maintained for a first CVD period of about 7 hours. After the first CVD period elapses, the introduced gas is switched from the acetylene/Ar gas mixture to pure Ar, which is introduced at a rate of 500 mL/minute. The temperature is ramped up to the post-CVD thermal treatment temperature of 1123 K and maintained at the thermal treatment conditions for about three hours. After three hours of post-CVD thermal treatment, the cylindrical container is permitted to cool partially down under Ar flow until reaching 823 K. Upon reaching the second CVD temperature of 823 K, the organic gas mixture of 4 vol. % acetylene in Ar is reintroduced into the cylindrical stainless-steel container at a flow rate of about 1000 mL/minute and maintained at that rate for a second CVD period of about 4 hours. After the second CVD period elapses, the introduced gas is switched from the organic precursor gas of acetylene/Ar mixture to pure Ar, which is introduced at a rate of 500 mL/minute. The temperature is ramped up to the second treatment temperature of 1123 K for the second post-CVD thermal treatment and maintained at the treatment temperature for three hours. After three hours of the second post-CVD thermal treatment, the cylindrical container is permitted to cool down under Ar flow until reaching room temperature. Upon reaching room temperature, the rotating cylinder is halted and the thermally-treated carbon-zeolite composite is collected. The thermally-treated carbon-zeolite composite is separated from the sea sand using a sieve, and the NaX zeolite is removed from the thermally-treated carbon-zeolite composite using the aqueous strong mineral acid mixture containing HCl/HF previously. The recovered methane microporous carbon adsorbents are tested for surface and pore properties as well as for comparative isothermal information.

TABLE 7

Pore structure and surface area properties of two methane microporous carbon adsorbents formed from commercial-grade sized NaX (1 gram) and scaled synthesis from commercial-grade sized NaX (50 grams).

| Sample | $S_{BET}$[1] ($m^2/g$) | $V_{micro}$[2] ($cm^3/g$) | $V_{meso}$ ($cm^3/g$) | $V_{total}$ ($cm^3/g$) |
|---|---|---|---|---|
| NaX-823-4H2H | 2980 | 1.18 | 0.23 | 1.41 |
| NaX-large scale synthesis | 2810 | 1.04 | 0.39 | 1.43 |

Brunauer-Emmett-Teller (BET) specific surface area.
[2]Micropore volume ($V_{micro}$) calculated using D-R equation.

Figure 24:
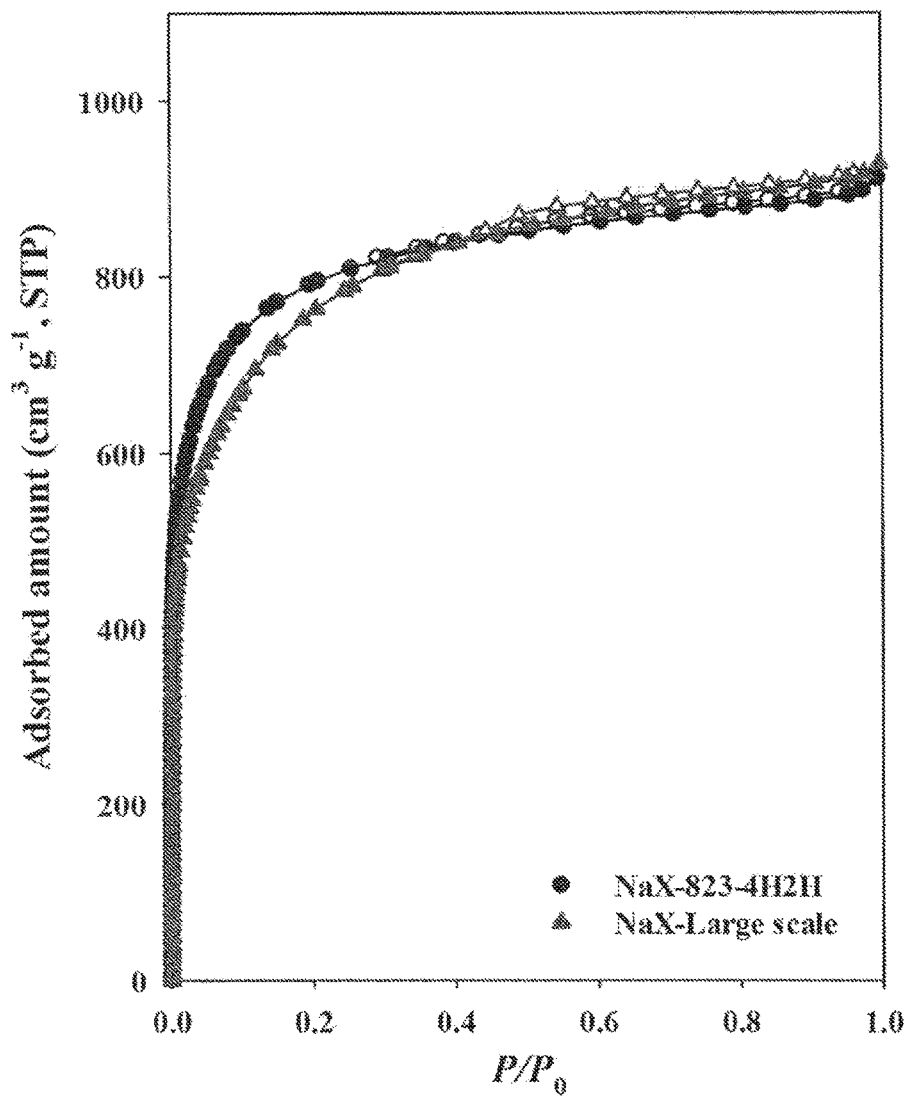
FIG. 24 is a graph showing traces of nitrogen adsorption-desorption isotherms for the NaX and the mass produced NaX methane microporous carbon adsorbents.

FIG. 24 is a graph showing traces of nitrogen adsorption-desorption isotherms for the NaX and the mass produced NaX methane microporous carbon adsorbents. As shown in Table 7, the methane microporous carbon adsorbent synthesized in a scaled synthesis process (50 grams of NaX zeolite) shows only a slight reduction in surface area and micropore volume versus the methane microporous carbon adsorbent synthesized using 1 g NaX zeolite in the plug-flow reactor (NaX-823-4H2H).

What is claimed is:
1. A sequential carbon synthesis method for forming a methane microporous carbon adsorbent, the method comprising:
   introducing an organic precursor gas comprising an organic precursor for a chemical vapor deposition (CVD) period to a crystalline zeolite that is maintained at a CVD temperature such that a carbon-zeolite composite forms, wherein the introduced organic precursor adsorbs via CVD into the crystalline zeolite, the organic precursor converts into carbon within the crystalline zeolite forming a carbon template of a zeolite;
   introducing a non-reactive gas for a thermal treatment period to the carbon-zeolite composite maintained at a thermal treatment temperature such that the thermally-treated carbon-zeolite composite forms, wherein the carbon template of the zeolite within the crystalline zeolite converts into a thermally-treated carbon template of the zeolite; and
   introducing an aqueous strong mineral acid mixture to the thermally-treated carbon-zeolite composite such that crystalline zeolite dissolves and the methane microporous carbon adsorbent forms, wherein the methane microporous carbon adsorbent is a negative replica of the crystalline zeolite, has a BET specific surface area, a micropore volume, a micropore to mesopore volume ratio, a stored methane value and a methane delivered value; and
   forming the crystalline zeolite, wherein forming the crystalline zeolite comprises ion-exchanging a first crystalline zeolite with calcium ions to form a second crystalline zeolite,
   wherein the crystalline zeolite comprises tri-ethanolamine (TEA), and
   wherein the shape of the crystalline zeolite has an octahedral geometry such that an edge length of the octahedron is in a range of 8 µm to 20 µm.

2. The method of claim 1, wherein the organic precursor is selected from the group consisting of acetylene, ethylene, propylene, ethanol and combinations thereof.

3. The method of claim 1, wherein the organic precursor gas further comprises the non-reactive gas.

4. The method of claim 1, wherein the CVD period is in a range of from 2 hours to 9 hours.

5. The method of claim 1, wherein the CVD temperature is in a range of from 800 K to 900 K.

6. The method of claim 1, wherein the non-reactive gas is selected from the group consisting of helium, argon and combinations thereof.

7. The method of claim 1, wherein the thermal treatment period is in a range of from 2 hours to 4 hours.

8. The method of claim 1, wherein the thermal treatment temperature is in a range of from 1100 K to 1200 K.

9. The method of claim 1, wherein the strong mineral acid is selected from the group consisting of hydrochloric acid (HCl), hydrofluoric acid (HF) and combinations thereof.

10. The method of claim 1, wherein the crystalline zeolite is selected from the group consisting of FAU, EMT, BEA zeolite structures, and combinations of the zeolite structures thereof.

11. The method of claim 1, further comprising:
   forming the crystalline zeolite.

12. The method of claim 1, wherein the sequential carbon synthesis of the crystalline zeolite to form the methane microporous carbon adsorbent is carried out using a large-scale, continuous batch process using a rotary tubular furnace.

13. The method of claim 12, wherein 50 grams of a commercial grade crystalline zeolite is used to form the methane microporous carbon adsorbent.

14. The method of claim 1, further comprising:
   introducing the organic precursor gas comprising the organic precursor for a second CVD period to the thermally-treated carbon-zeolite composite that is maintained at a second CVD temperature such that a second carbon-zeolite composite forms, wherein the organic precursor adsorbs via CVD into the thermally-treated carbon-zeolite composite, the organic precursor converts into carbon within the thermally-treated carbon-zeolite composite and both the carbon and the thermally-treated carbon-zeolite composite form a second carbon template of a zeolite; and
   introducing the non-reactive gas for a second thermal treatment period to the second carbon-zeolite composite maintained at a second thermal treatment temperature such that a second thermally-treated carbon-zeolite composite forms, wherein the second carbon template of the zeolite within the second carbon-zeolite composite converts into a second thermally-treated carbon-zeolite composite;
   wherein both the introducing the organic precursor gas and the introducing the non-reactive gas occur before the introduction of the aqueous strong mineral acid mixture, and
   wherein the aqueous strong mineral acid mixture is introduced to the second thermally-treated carbon-zeolite composite instead of the thermally-treated carbon-zeolite composite.

15. The method of claim 14, wherein the CVD temperature and the second CVD temperature are the same.

16. The method of claim 14, wherein the CVD period and the second CVD period are the same.

17. A sequential carbon synthesis method for forming a methane microporous carbon adsorbent, the method comprising:

introducing an organic precursor gas comprising an organic precursor for a chemical vapor deposition (CVD) period to a crystalline zeolite that is maintained at a CVD temperature such that a carbon-zeolite composite forms, wherein the introduced organic precursor adsorbs via CVD into the crystalline zeolite, the organic precursor converts into carbon within the crystalline zeolite forming a carbon template of a zeolite;

introducing a non-reactive gas for a thermal treatment period to the carbon-zeolite composite maintained at a thermal treatment temperature such that the thermally-treated carbon-zeolite composite forms, wherein the carbon template of the zeolite within the crystalline zeolite converts into a thermally-treated carbon template of the zeolite;

introducing an aqueous strong mineral acid mixture to the thermally-treated carbon-zeolite composite such that crystalline zeolite dissolves and the methane microporous carbon adsorbent forms, wherein the methane microporous carbon adsorbent is a negative replica of the crystalline zeolite, has a BET specific surface area, a micropore volume, a micropore to mesopore volume ratio, a stored methane value and a methane delivered value; and forming the crystalline zeolite, wherein forming the crystalline zeolite comprises ion-exchanging a first crystalline zeolite with calcium ions to form a second crystalline zeolite, wherein the formed methane microporous carbon adsorbent has a BET specific surface area of 1596-3049 $m^2/g$, a micropore volume of 0.58-1.12 $cm^3/g$, a micropore to mesopore volume ratio of 1.21-3.07, a stored methane value of 142-153 mg/g, and a methane delivered value of 103-105 mg/g.

18. The method of claim 17, wherein the formed methane microporous carbon adsorbent has a BET specific surface area of 2810 $m^2/g$, and a micropore volume of 1.04 $cm^3/g$.

\* \* \* \* \*